United States Patent
Fujie et al.

(10) Patent No.: US 10,870,929 B2
(45) Date of Patent: Dec. 22, 2020

(54) POLYPROPYLENE FIBER AND METHOD FOR MANUFACTURING POLYPROPYLENE FIBER

(71) Applicant: Mitsubishi Chemical Corporation, Chiyoda-ku (JP)

(72) Inventors: Masaki Fujie, Chiyoda-ku (JP); Tomoyoshi Yamashita, Chiyoda-ku (JP); Hironobu Ikeda, Chiyoda-ku (JP); Junya Imakita, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/743,565

(22) PCT Filed: Jul. 12, 2016

(86) PCT No.: PCT/JP2016/070497
§ 371 (c)(1),
(2) Date: Jan. 10, 2018

(87) PCT Pub. No.: WO2017/018195
PCT Pub. Date: Feb. 2, 2017

(65) Prior Publication Data
US 2018/0202077 A1    Jul. 19, 2018

(30) Foreign Application Priority Data

Jul. 24, 2015 (JP) ................. 2015-146843
Jul. 24, 2015 (JP) ................. 2015-146868
Jul. 24, 2015 (JP) ................. 2015-146902
Jul. 24, 2015 (JP) ................. 2015-146904

(51) Int. Cl.
| | | |
|---|---|---|
| D01F 6/06 | (2006.01) | |
| C08L 23/12 | (2006.01) | |
| D02J 1/22 | (2006.01) | |
| D01D 5/16 | (2006.01) | |
| G01N 25/48 | (2006.01) | |

(52) U.S. Cl.
CPC ............ *D01F 6/06* (2013.01); *C08L 23/12* (2013.01); *D01D 5/16* (2013.01); *D02J 1/22* (2013.01); *G01N 25/4866* (2013.01); *C08L 2205/16* (2013.01); *C08L 2205/24* (2013.01)

(58) Field of Classification Search
CPC .................................. C08L 23/16; D01F 6/06
See application file for complete search history.

(56) References Cited

U.S. PATENT DOCUMENTS

| | | | | |
|---|---|---|---|---|
| 6,416,699 | B1 * | 7/2002 | Gownder ............. | D01F 6/06 264/210.8 |
| 6,818,683 | B2 * | 11/2004 | Bodaghi .............. | B29C 48/05 523/201 |
| 7,101,622 | B2 * | 9/2006 | Chang .................. | D01F 8/06 428/364 |
| 8,647,741 | B2 * | 2/2014 | Katayama ............. | D07B 1/02 428/364 |
| 9,057,148 | B2 * | 6/2015 | Kitagawa .............. | D01F 6/06 |
| 2010/0173547 | A1 | 7/2010 | Katayama et al. | |

FOREIGN PATENT DOCUMENTS

| | | | | |
|---|---|---|---|---|
| CN | 1128811 | A | * 8/1996 | .............. D01F 6/06 |
| CN | 1934296 | A | 3/2007 | |
| JP | 9-170111 | A | 6/1997 | |
| JP | 10-163421 | A | 7/1998 | |
| JP | 2002/20926 | A | 1/2002 | |
| JP | 2002-180347 | A | 6/2002 | |
| JP | 2003-268622 | A | 9/2003 | |
| JP | 2003/293216 | A | 10/2003 | |
| JP | 2007-529650 | | 10/2007 | |
| JP | 2008-266871 | A | 11/2008 | |
| JP | 2008-266872 | A | 11/2008 | |
| JP | 2009/7727 | A | 1/2009 | |
| JP | 2009-79306 | A | 4/2009 | |
| JP | 2013-249554 | | 12/2013 | |
| JP | 5607827 | B2 | 10/2014 | |
| WO | WO 2012/164656 | A1 | 12/2012 | |

OTHER PUBLICATIONS

CN 1128811 A (Jun. 14, 1996) Yushan Sun et al. ; machine translation. (Year: 1996).*
International Search Report dated Sep. 6, 2016, in PCT/JP2016/070497 filed Jul. 12, 2016.
Office Action dated Feb. 26, 2019 in corresponding Japanese Patent Application No. 2015-146843 (with English Translation), 9 pages.
Office Action dated Feb. 26, 2019 in corresponding Japanese Patent Application No. 2015-146868 (with English Translation), 7 pages.
Office Action dated Feb. 26, 2019 in corresponding Japanese Patent Application No. 2015-146904 (with English Translation), 6 pages.
Japanese Office Action dated Sep. 3, 2019 in Patent Application No. 2015-146843 (with English translation), 14 pages.
Japanese Office Action dated Sep. 3, 2019 in Patent Application No. 2015-146904 (with English translation), 11 pages.
Japanese Office Action dated Sep. 3, 2019 in Patent Application No. 2016-085421 (with English translation), 7 pages.
Combined Chinese Office Action and Search Report dated Sep. 2, 2019 in Patent Application No. 201680038234.2 (with partial English translation and English translation of categories of cited documents), 25 pages.

(Continued)

*Primary Examiner* — Rip A Lee
(74) *Attorney, Agent, or Firm* — Oblon, McClelland, Maier & Neustadt, L.L.P.

(57) ABSTRACT

Obtained is a polypropylene fiber that selectively satisfies any of the following requirements: the degree of amorphous orientation being not lower than 85%; the degree of crystalline orientation being not lower than 90%; the degree of crystallinity being 60-75%; the strength being not lower than 7 cN/dtex; the initial elastic modulus being not lower than 100 cN/dtex; the rupture elongation being 10-30%; and the single fiber fineness being 3-20 dtex. This polypropylene fiber, in which a crystalline chain and an amorphous chain are highly oriented and that has high strength and high initial elastic modulus, is produced through a two-stage drawing method and by controlling the drawing tension of the final stage while maintaining production speed.

19 Claims, No Drawings

(56) References Cited

OTHER PUBLICATIONS

Extended Search Report dated Jun. 14, 2018 in European Patent Application No. 16830300.6.
Robert J. Samuels, "Spherulite Structure, Deformation Morphology and Mechanical Properties of Isotactic Polypropylene Fibers", Journal of Polymer Science: Part C, No. 20, 1967, pp. 253-384.
Japanese Office Action dated Feb. 12, 2020 in Japanese Patent Application No. 2016-085421 (with unedited computer generated English translation), 7 pages.
Combined Chinese Office Action dated Jun. 1, 2020, in Patent Application No. 201680038234.2, 29 pages (with unedited computer generated English translation).
Japanese Office Action dated Jul. 21, 2020, in corresponding Japanese Patent Application No. 2016-085421 (with English translation).

* cited by examiner

POLYPROPYLENE FIBER AND METHOD FOR MANUFACTURING POLYPROPYLENE FIBER

TECHNICAL FIELD

The present invention relates to a polypropylene fiber used for industrial materials, interior for buildings and automobiles, medical and hygiene, clothing and the like and a method for producing the polypropylene fiber.

BACKGROUND ART

Since polypropylene fiber has excellent properties such as excellent water repellency and non-absorbability, lightweight because of its low specific gravity, and excellent chemical resistance, it is extensively used for industrial materials, interior for buildings and automobiles, medical and hygiene, clothing, and the like. Especially in industrial material applications, it is widely used for such as ropes, curing nets, horizontal nets and the like, making use of lightness and strength, however, further strengthening is required.

It is known that the strength of the polypropylene fiber greatly depends on drawing conditions. Especially when draw ratio is increased, the strength of the polypropylene fiber is largely improved. However, when attempting to draw at high draw ratio at a normal drawing velocity, fuzz and yarn breakage frequently occurs, therefore, it becomes difficult to produce stably. Accordingly, attempts have been made to increase the strength by slowing the drawing velocity and drawing at a highest possible draw ratio.

For example, Japanese Patent No. 5607827 (Patent Document 1) discloses a method of producing a polypropylene fiber including a spinning process in which the polypropylene is melt extruded, and rapidly cooled down to a temperature equal to or higher than a glass transition temperature of polypropylene and equal to or lower than the glass transition temperature—15° C., a cooling process at the temperature, and a drawing process. Although this method describes that the strength becomes as high as 1.6 GPa or more, the drawing is performed at an extremely low speed with a hand drawing machine, and further to be kept cool at 0° C. for several days. This method is considered to be difficult industrially.

Japanese Patent Publication No. 2003-293216 (Patent Document 2) discloses a polypropylene fiber for reinforcing concretes having a fiber strength of 9 cN/dtex and a streaky rough surface structure formed along a curved surface of a fiber surface. However, this is also conducted at a drawing velocity of about 50 m/min, which is inferior in productivity.

Further, for example, Japanese Patent Publication No. 2002-180347 (Patent Document 3) discloses a method of drawing a crystalline polymer substance using a drawing bath filled with pressurized saturated steam of about 0.3 to 0.5 MPa as a drawing medium in a container sealed at both ends with pressurized water. With this method, it is possible to produce high strength polypropylene fibers of 9.7 cN/dtex or more. However, this method requires a special and expensive pressurized saturated steam drawing apparatus as compared with an ordinary hot plate drawing and the like. Furthermore, the pressurized saturated steam drawing has a problem that the amount of fiber to be charged is limited, therefore, it is unsuitable for mass production.

Further, Japanese Patent Publication No. 2009-007727 (Patent Document 4) discloses a method for producing a polypropylene fiber having a fiber strength of 7 cN/dtex or more and a surface having an uneven structure by pre-drawing an undrawn yarn obtained by melt spinning the polypropylene having an isotactic pentad fraction of 94% or more at a temperature of 120° C. to 150° C. and at a draw ratio of 3 to 10 times, and subsequently post-drawing it at a temperature of 170° C. to 190° C., at a deformation rate of 1.5 times/min to 15 times/min, and at a draw ratio of 1.2 times to 3.0 times. In this technique, since the deformation rate in post-drawing is extremely slow, it is difficult to produce the high strength polypropylene fiber with high production.

PRIOR ART DOCUMENT

Patent Documents

Patent Document 1: JP-5607827-B
Patent Document 2: JP-2003-293216-A
Patent Document 3: JP-2002-180347-A
Patent Document 4: JP-2009-007727-A

SUMMARY OF INVENTION

Problems to be Solved by the Invention

An object of the present invention is to provide a polypropylene fiber having a highly oriented crystalline chain and amorphous chain and a method for producing the same. The polypropylene fiber having the highly oriented crystalline chain and amorphous chain is excellent in strength and initial elastic modulus.

Means for Solving the Problems

The present invention is a polypropylene fiber having an amorphous orientation degree of 85% or more.

The polypropylene fiber of the present invention preferably has a crystallinity degree of 60% to 75% as determined by a wide angle X-ray diffraction measurement.

The polypropylene fiber of the present invention preferably has an endothermic amount of a melting peak of 85 J/g to 120 J/g by a DSC measurement.

The polypropylene fiber of the present invention preferably has a single fiber fineness of 3 dtex to 20 dtex.

The polypropylene fiber of the present invention preferably has a total fineness of 90 dtex to 900 dtex.

The polypropylene fiber of the present invention preferably has a scattering intensity ratio in a meridian direction (scattering intensity in a meridian direction/scattering intensity in an equatorial direction) with respect to a scattering intensity in an equatorial direction of 0.5 to 0.95 by a small angle X-ray scattering measurement, and a crystalline orientation degree of 90% or more.

The polypropylene fiber of the present invention preferably has a strength of 7 cN/dtex or more, an initial elastic modulus of 100 cN/dtex or more, and a elongation at break of 10% to 30%.

A method for producing the polypropylene fiber of the present invention includes drawing an undrawn yarn having a crystalline structure ratio of 30 mass % or lower in one stage or multiple stages of two or more, and setting a total draw ratio at 5 to 15 times, a drawing tension at the time of final drawing at 1.5 cN/dtex to 5.0 cN/dtex, and a deformation rate at 1 (1/sec) to 10 (1/sec).

In the method of producing the polypropylene fiber of the present invention, it is preferable that, in a drawing process in which the drawing is conducted in two stages, a temperature of a fiber drawn in a second stage is set at 140° C. to 180° C., and a draw ratio is set at 1.01 times to 2.00 times.

In the method of producing the polypropylene fiber of the present invention, it is preferable that, in the drawing process in which the drawing is conducted in two stages, the temperature of a fiber drawn in a first stage is 110° C. to 160° C., and the draw ratio is 4 times to 14 times.

A birefringence value of the undrawn yarn is preferably $0.1 \times 10^{-3}$ to $2.5 \times 10^{-3}$. Further, the undrawn yarn is produced from a polypropylene resin having a melt flow rate of 12 g/10 min to 28 g/10 min as a raw material and obtained by discharging it from discharge holes of a spinning nozzle at a temperature of (melting point of the polypropylene resin+ 60° C.) to (melting point of polypropylene resin+150° C.), cooling and solidifying it by applying air at 10° C. to 40° C., and taking it at a take-up speed of 200 m/min to 1000 m/min.

Effects of the Invention

According to the present invention, it is possible to provide a polypropylene fiber having a highly oriented crystalline chain and amorphous chain by controlling a drawing tension in a final stage while maintaining a production rate. The polypropylene fiber having the highly oriented crystalline chain and amorphous chain is excellent in strength and initial elastic modulus.

Modes for Carrying Out the Invention

Hereinafter, the present invention will be described in detail with representative examples.
<Polypropylene Fiber Raw Material>

A melt flow rate (hereinafter referred to as MFR) of a polypropylene resin as a raw material of a polypropylene fiber of the present invention [measured according to JIS K 7201, under the conditions of temperature: 230° C., load: 2.16 kg, time: 10 minutes] is preferably 12 g/10 min to 28 g/10 min. When the MFR is 12 g/10 min or more, melt viscosity does not become too high, so that molding processability becomes favorable. Further, since tension in spinning is not increased, oriented crystallization can be suppressed. Therefore, the crystalline structure ratio of the obtained undrawn yarn is not increased and the birefringence value can also be lowered. On the other hand, when the MFR is 28 g/10 min or less, molecular weight of the polypropylene does not become too low, and high strength polypropylene fiber can be easily obtained. In addition, melt viscosity does not become too low, and necessary spinning line tension can be obtained. The MFR of the polypropylene resin is preferably 14 g/10 min to 25 g/10 min, and more preferably 16 g/10 min to 22 g/10 min.
<Others>

Isotactic pentad fraction of the polypropylene resin used in the present invention is preferably 94% to 99%. When it is 94% or more, the polypropylene fiber tends to form a uniform crystalline structure. Whereas, when it is 99% or less, it is possible to obtain the polypropylene fiber industrially.

Molecular weight distribution of the polypropylene resin is preferably 5 or less. When the molecular weight distribution is 5 or less, the polypropylene fiber tends to have a uniform crystalline structure, so that the fiber strength is unlikely to lower. The molecular weight distribution is more preferably 4 or less.

In the polypropylene resin used in the present invention, additives such as antioxidants, light stabilizers, ultraviolet absorbers, neutralizing agents, nucleating agents, epoxy stabilizers, lubricants, antibacterial agents, flame retardants, antistatic agents, pigments, plasticizers and the like may further be added in a range not hindering the effect of the present invention as required.
<A Method of Producing Polypropylene Fiber>
<Undrawn Yarn>

After the above-mentioned polypropylene fiber raw material is charged into an extruder and kneaded, it is quantitatively discharged from a nozzle with a gear pump. A spinning temperature may be set according to the MFR of the polypropylene fiber raw material, and a temperature of the polypropylene resin melt and discharged from discharge holes of a spinning nozzle is preferably from (melting point of the polypropylene resin+60° C.) to (melting point of polypropylene resin+150° C.). When the temperature of the resin is (melting point of the polypropylene resin+60° C.) or higher, the melt viscosity of the polypropylene raw material does not become high, so that molding processability becomes favorable. Therefore, the polypropylene fiber having a homogeneous crystalline structure can be easily obtained. On the other hand, when the temperature of the resin is (melting point of the polypropylene resin+150° C.) or lower, thermal decomposition of the polypropylene raw material itself does not proceed, so that the strength of the obtained polypropylene fiber is unlikely to lower. The temperature of the resin is more preferably from (melting point of the polypropylene resin+80° C.) to (melting point of the polypropylene resin+130° C.), and further preferably from (melting point of the polypropylene resin+100° C.) to (melting point of the polypropylene resin+120° C.).

A mass flow of the polymer discharged from the discharge holes of the spinning nozzle (hereinafter may be referred to as "hole" in some cases) is preferably 0.1 g/min to 3 g/min per hole. When the mass flow is 0.1 g/min or more, a yarn fluctuation is not noticeable due to cold air in a quench cylinder. Therefore, fusing between the filaments and contacts with the guide hardly occur. As a result, the undrawn yarn can be stably obtained. On the other hand, when the mass flow is 3 g/min or less, the resin can be cooled down sufficiently. Therefore, fusing between the filaments hardly occurs at the time of winding. As a result, the undrawn yarn can be stably obtained. The mass flow is preferably 1.0 g/min to 2.5 g/min, and further preferably 1.2 g/min to 2.0 g/min.

The fiber extruded from the discharge holes of the spinning nozzle is rapidly cooled down by applying cold air at 10° C. to 40° C. in the quench cylinder. The speed of cold air is preferably in a range of 0.5 m/sec to 5 m/sec from a viewpoint that cooling of the fiber proceeds and fusion of the fibers due to yarn fluctuation does not occur. Thereafter, an oil agent is applied to the cooled and solidified fibers with an oiling device as appropriate.

A spinning draft is preferably 5 times to 150 times. Here, the spinning draft can be calculated by take-up speed (m/min)/discharge line speed (m/min). When the spinning draft is 5 times or more, tension is applied on the spinning line. Therefore, yarn fluctuation due to the influence of cold air in the quench cylinder does not become noticeable. As a result, the undrawn yarn can be stably obtained. On the other hand, when the spinning draft is 150 times or less, the tension does not become too high on the spinning line. Therefore, the promotion of orientational crystallization is suppressed, and the obtained undrawn yarn does not become too high in crystallinity and orientation. As a result, the drawing property becomes favorable.

A take-up speed of the undrawn yarn is preferably 200 m/min to 1000 m/min. When the take-up speed is 200 m/min or more, the productivity becomes favorable. On the other hand, when it is 1000 m/min or less, the obtained undrawn yarn does not become too high in crystallinity and orientation. Therefore, the drawing property becomes favorable. The take-up speed is more preferably from 250 m/min to 800 m/min, and further preferably from 300 m/min to 600 m/min.

A ratio of the crystalline structure of the undrawn yarn used in the present invention is preferably 30 mass % or lower. The ratio of the crystalline structure of this undrawn yarn can be confirmed using a wide angle X-ray diffraction (Ultrax18, wavelength λ=1.54 Å, manufactured by Rigaku Corporation). It is known that the structure of polypropylene has α crystal, β crystal and γ crystal as a crystalline structure, an amorphous structure, and a meso-structure which is an intermediate structure between crystal and amorphous. In the α crystal according to the present invention, four sharp peaks were observed at diffraction angles of 14.1°, 16.9°, 18.6°, and 21.6°. In the amorphous structure, a broad amorphous peak was observed at diffraction angle of 16°. In the meso-structure, slightly broad peaks were observed at diffraction angles of 15° and 21°. (Non-Patent Document "Macromolecules" 2005, 38, 8749-8754). The ratio of each structure can be calculated by a waveform separation. Specifically, with respect to the wide angle X-ray diffraction pattern of the undrawn yarn, the peaks are respectively set at diffraction angles of 14.1°, 16.9°, 18.6°, 21.6° (crystalline structure), 16° (amorphous structure), 15°, 21° (meso-structure), thereby, a waveform separation is performed to calculate the ratio of the crystalline structure by dividing the sum of the peak integrated intensities of the crystalline structure by all the peak integrated intensities.

From the viewpoint of drawing property, the ratio of the crystalline structure of the undrawn yarn used in the present invention is preferably 30 mass % or lower, more preferably 20 mass % or less, and further preferably 10 mass % or less. In general, α crystal which is a crystalline structure takes a folded structure. In the subsequent drawing process, this folded structure is converted into an extended chain. However, it is energetically disadvantageous to convert the once formed folded structure into the extended chain as compared with the meso-structure or the amorphous structure. Therefore, when there are a lot of crystalline structures, the drawing property decreases as compared with the meso-structure or the amorphous structure. As a result, it becomes difficult to obtain the polypropylene fiber having high strength and high initial elastic modulus.

A birefringence value of the undrawn yarn of the present invention is preferably $0.1 \times 10^{-3}$ to $2.5 \times 10^{-3}$. The birefringence value is obtained by quantifying the orientation state of the polypropylene molecule. The smaller the birefringence value is, the lower the molecular orientation is. When the molecular orientation of the undrawn yarn is small, it is possible to draw at a high draw ratio in a later drawing process. Therefore, the high strength polypropylene fiber can be obtained. When the birefringence value of the undrawn yarn is $0.1 \times 10^{-3}$ or more, industrial production is possible. When the birefringence value is $2.5 \times 10^{-3}$ or less, it is possible to draw at a high draw ratio in the drawing process, and the strength of the obtained polypropylene fiber can be improved. The birefringence value of the undrawn yarn is more preferably $0.3 \times 10^{-3}$ to $2.0 \times 10^{-3}$, and further preferably $0.5 \times 10^{-3}$ to $1.0 \times 10^{-3}$.

<Drawing of Undrawn Yarn>
<Drawing Step>

Drawing of the undrawn yarn may be performed in an off-line state with a once rolled up undrawn yarn or may be continuously performed without being rolled up once from the spinning process. For drawing, a known method such as hot plate drawing, hot roll drawing, air heating furnace drawing or the like can be possible. From the viewpoint of lowering the deformation rate, it is preferable to draw in the hot plate or the air heating furnace. Here, the deformation rate can be calculated by dividing the value obtained by subtracting the velocity of the supply roll from the velocity of the take-up roll by the length of the hot plate or the air heating furnace. It is difficult to actually obtain the deformation rate when using a hot roll. However, since it is drawn at the moment away from the hot roll, the deformation rate becomes faster as compared with a case of the hot plate or the air heating furnace drawing.

The method of producing the polypropylene fiber of the present invention can be carried out in one stage or in two or more stages using the undrawn yarn. From the viewpoint of lowering the deformation rate, it is preferable to draw in two or more stages.

<One Stage Drawing>

In a case of drawing in one stage, the draw ratio is preferably 5 times to 15 times. When the draw ratio is 5 times or more, the highly oriented polypropylene fiber can be easily obtained. Therefore, the high strength polypropylene fiber can be easily obtained. When the draw ratio is 15 times or less, occurrence of fuzz and bundle breakage can be reduced, therefore, the polypropylene fiber can be stably obtained. The draw ratio is more preferably 6 times to 13 times, and further preferably 7 times to 12 times.

The undrawn yarn obtained by the present invention can be drawn at a high draw ratio, therefore, the high strength fiber can be obtained. The draw ratio is preferably 0.5 times to 0.9 times of a maximum draw ratio at break at the temperature at which drawing is actually performed. When the draw ratio is 0.5 times or more of the maximum draw ratio at break, the strength can be increased. On the other hand, when the draw ratio is 0.9 times or less of the maximum draw ratio at break, fuzz and yarn breakage hardly occurs. Therefore, drawing can be stably performed. The draw ratio is more preferably 0.55 times to 0.85 times, and further preferably 0.6 to 0.8 times of the maximum draw ratio at break at the drawing temperature.

<Drawing Temperature of One Stage Drawing>

In a case of drawing in one stage, a drawing temperature of the undrawn yarn is preferably 110° C. to 160° C. When the drawing temperature is 110° C. or higher, the drawing property tends to be favorable because it is higher than the crystalline dispersion temperature of the polypropylene. When the drawing temperature is 160° C. or lower, a melt rupture does not occur and the drawing is stabilized since it is lower than the melting point of the polypropylene undrawn yarn. The drawing temperature is more preferably 125° C. to 155° C., and further preferably 130° C. to 150° C.

The fibers may be preheated prior to drawing. As preheating before drawing, a heating roll, a hot plate, an air heating furnace or the like can be used. The temperature of the yarn to be preheated is preferably 50° C. to 120° C., and more preferably 60° C. to 110° C.

<Drawing Tension of One Stage Drawing>

In a case of drawing in one stage, a drawing tension is preferably 1.5 cN/dtex to 5.0 cN/dtex. The drawing tension can be calculated by dividing the value measured with a tension meter by the fiber fineness after drawing. When the drawing tension is 1.5 cN/dtex or more, force is easily transmitted to the molecular chain during drawing, so that the crystalline chain and the amorphous chain are easily oriented. When the drawing tension is 5.0 cN/dtex or less, the molecular chain is not forcibly extended, so that it is possible to stably draw without fluff and bundle breakage. From the above viewpoint, the drawing tension is more preferably 2.0 cN/dtex to 4.0 cN/dtex, and further preferably 2.6 cN/dtex to 3.8 cN/dtex.

<Drawing Velocity of One Stage Drawing>

In a case of drawing in one stage, a drawing velocity is preferably 100 m/min to 1000 m/min. Here, the drawing velocity refers to the take-up roll speed at the time of drawing. When the drawing velocity is 100 m/min or more, the productivity becomes favorable. On the other hand, when the drawing velocity is 1000 m/min or less, the deformation rate does not become excessively fast, therefore, yarn breakage can be reduced. The drawing velocity is more preferably 150 m/min to 800 m/min, and further preferably 200 m/min to 600 m/min.

In the case of drawing in one stage as described above, the undrawn yarn having a low ratio of crystalline structure and a low orientation can be drawn at a high draw ratio. The strength of the obtained polypropylene fiber can exceed 6.8 cN/dtex.

<Multistage Drawings>

Next, a case of drawing in multiple stages will be described.

It is important to bring a structure of the processed yarn at the time of completion of the first stags drawing to be close to a homogeneous structure in a process of producing the polypropylene fiber including a drawing process in which drawing is performed in two or more stages after spinning. Generally, in the drawing of the second or subsequent stage, the drawing treatment is carried out at a higher temperature than in the first stage. Since a rotational movement of the molecular chain and an elongation of the amorphous chain in the second or subsequent stage drawing, which is a high temperature drawing, it is difficult to form an extended chain effectively in an inhomogeneous structure formed up to the first stage drawing other than the extended chain. In addition, when the process yarn at the completion of the first stage drawing is inhomogeneous, a tension distribution to the molecular chain becomes nonuniform after the drawing in the second or subsequent stage. Therefore, fuzz and yarn breakage frequently occurs.

Even in the case of multistage drawing, the yarn temperature at which the undrawn yarn is drawn in the first stage is preferably 110° C. to 160° C. When the drawing temperature is 110° C. or higher, which is above the crystalline dispersion temperature of the polypropylene, the drawing property tends to be favorable. When the drawing temperature is 160° C. or lower, which is the melting point of the polypropylene undrawn yarn or below thereof, melt rupture hardly occurs and the drawing is stabilized. The yarn temperature during the drawing is more preferably 120° C. to 155° C., and further preferably 130° C. to 150° C.

The fibers may be preheated prior to drawing. For preheating before drawing, a heating roll, a hot plate, an air heating furnace or the like can be used. The preheating temperature is preferably 50° C. to 120° C., and more preferably 60° C. to 110° C.

A draw ratio of the first stage in the multistage drawing is preferably from 4 to 14 times. When the draw ratio is 4 times or more, the highly oriented polypropylene fiber can be easily obtained. Therefore, the high strength polypropylene fiber can be easily obtained. When the draw ratio is 14 times or less, occurrence of fuzz and bundle breakage can be reduced. Therefore, the polypropylene fiber can be stably obtained. The draw ratio is more preferably from 5.5 times to 11 times, and further preferably from 6 times to 10 times.

According to the present invention, there is provided a method of producing a polypropylene fiber including a drawing process of drawing a polypropylene undrawn yarn in two or more stages. In the process yarn at the time of completion of the first stage drawing, an intensity ratio in the meridian direction with respect to an equatorial direction according to a small angle X-ray scattering measurement needs to be 1.01 to 1.60. In the polypropylene process yarn in which a lamellar structure is laminated, a peak is observed in the meridian direction in the small angle X-ray scattering measurement. That is, the process yarn at the time of completion of the first stage obtained by the present invention has a structure in which the ratio of the lamellar structure is small. When the intensity ratio is 1.60 or less, the ratio of the lamellar structure of the process yarn is small, so that fuzz and yarn breakage in the second or subsequent drawing can be reduced. Thereby, the drawing can be stably performed. As a result, the extended chain tends to be easily formed, and the high strength polypropylene can be easily obtained. In the process yarn at the time of completion of the first stage drawing, the intensity ratio in the meridian direction with respect to the strength in the equatorial direction in the small angle X-ray scattering measurement is more preferably 1.02 to 1.40, and further preferably 1.03 to 1.25.

It is preferable that the process yarn at the time of completion of the first stage drawing has an area ratio of a melting peak at 160° C. to 166° C. with respect to a melting peak at 168° C. to 174° C. in the DSC measurement is 57.5% or less. The melting peak at 168° C. to 174° C. attributes to the melting of the extended chain, and the melting peak at 160° C. to 166° C. attributes to the melting of the lamellar structure or the structure which fails transition to the extended chain. That is, the smaller the area ratio of the melting peak at 160° C. to 166° C. with respect to the melting peak at 168° C. to 174° C. is, the more uniform the structure is. When the area ratio of the melting peak at 160° C. to 166° C. with respect to the melting peak at 168° C. to 174° C. in the DSC measurement is 57.5% or lower, the ratio of the inhomogeneous structure is low. Therefore, fuzz and yarn breakage can be reduced in the second or subsequent stage drawing. The extended chain can be formed easily in the second or subsequent stage drawing, so that the strength of the final polypropylene fiber is improved. The area ratio of the melting peak at 160° C. to 166° C. with respect to the melting peak at 168° C. to 174° C. in the DSC measurement is more preferably 57% or lower, and further preferably 56.5% or lower.

The first stage drawing and subsequent stage drawing may be carried out continuously, or after the first stage drawing is completed and the fiber is once wound up, the next drawing may be carried out again. From the viewpoint of productivity, it is preferable to continuously conduct the first stage and subsequent stage drawing.

A draw ratio of the final stage is preferably 1.01 times to 2.00 times. When the draw ratio is 1.01 times or more, the drawing effect is easily obtained. When it is 2.00 times or less, yarn breakage or bundle breakage hardly occurs, and therefore, stable drawing can be performed. The draw ratio in the final stage is more preferably 1.05 times to 1.6 times, and further preferably 1.1 times to 1.4 times.

<Total Draw Ratio at the Time of Final Stage Drawing>

A total draw ratio is preferably 5 times to 15 times. When the total draw ratio is 5 times or more, the highly oriented polypropylene fiber can be easily obtained. Therefore, the high strength polypropylene fiber can be easily obtained.

When the total draw ratio is 15 times or less, occurrence of fuzz and bundle breakage can be reduced and the polypropylene fiber can be stably obtained. The total draw ratio is more preferably 6 times to 13 times, and further preferably 7 times to 12 times.

<Drawing Tension at the Time of Final Stage Drawing>

Drawing tension at the time of final stage drawing is preferably 1.5 cN/dtex to 5.0 cN/dtex. When the drawing tension is 1.5 cN/dtex or more, force is transmitted to the molecular chain during drawing, so that the crystalline chain and the amorphous chain are sufficiently oriented. When the drawing tension is 5.0 cN/dtex or less, the molecular chain is not forcibly extended, so fuzz and bundle breakage are reduced, and drawing can be stably conducted. The drawing tension is more preferably 2.0 cN/dtex to 4.0 cN/dtex, and further preferably 2.6 cN/dtex to 3.8 cN/dtex.

<Drawing Temperature at the Time of Final Stage Drawing>

It is preferable that the yarn temperature drawn at the time of final stage drawing is 140° C. to 180° C. When the yarn temperature is 140° C. or higher, the crystalline structure formed up to the preceding stage is more easily deformed in the final stage drawing. Therefore, it is easy to obtain a polypropylene fiber, which are highly oriented crystalline chain and amorphous chain. When the yarn temperature is 180° C. or lower, molecular relaxation hardly occurs, and the crystalline chain and the amorphous chain are sufficiently oriented. The yarn temperature is more preferably 145° C. to 175° C., and further preferably from 150° C. to 168° C.

The yarn may be preheated before drawing at the time of final stage drawing. For preheating before drawing, a heating roll, a hot plate, an air heating furnace or the like can be used. The yarn temperature of the preheating is preferably 100° C. to 140° C., and more preferably 110° C. to 130° C.

<Deformation Rate at the Time of Final Stage Drawing>

A deformation rate at the time of final stage drawing, is preferably 1 (1/sec) to 10 (1/sec). When the deformation rate is 1 (1/sec) or higher, molecular relaxation hardly occurs during drawing, and the highly oriented crystalline chain and amorphous chain can be obtained. When the deformation rate is 1 (1/sec) or lower, the molecular chain is not forcibly extended, so that yarn breakage or bundle breakage hardly occurs. The deformation rate is more preferably 2.5 (1/sec) to 7 (1/sec), and further preferably 3 (1/sec) to 5 (1/sec).

<Drawing Velocity at the Time of Final Stage Drawing>

A drawing velocity at the time of final stage drawing is preferably 100 m/min to 1000 m/min. Here, the drawing velocity refers to a take-up roll speed at the time of drawing. When the drawing velocity is 100 m/min or higher, high productivity can be obtained. On the other hand, when the drawing velocity is 1000 m/min or lower, the deformation rate does not become excessively high, thereby, yarn breakage can be reduced. The drawing velocity is more preferably 150 m/min to 800 m/min, and further preferably 200 m/min to 600 m/min.

<Polypropylene Fiber>

The polypropylene fiber of the present invention has an amorphous orientation degree of 85% or higher. It is thought that the amorphous chain greatly contributes to a stress transmission. When the amorphous orientation degree is 85% or higher, the high strength polypropylene fiber tends to be easily obtained. From the above viewpoint, the amorphous orientation degree is more preferably 88% to 98%, and further preferably 90% to 92%.

In the polypropylene fiber of the present invention, the crystallinity degree as determined by the wide angle X-ray diffraction measurement is preferably 60% to 75%.

When the crystallinity degree is 60% or higher, the amorphous chair appropriately contributes to the stress transmission, which is preferable. When the crystallinity degree is 75% or lower, it is considered that amorphous chain greatly contributes to the stress transmission, which is preferable. The crystallinity degree of the ordinary high strength olefin fiber exceeds 80% (Japanese Publication No. 2008-519180, for example). An intercrystalline bridge is said to be formed when the crystallinity degree exceeds 70% (Polymer, 19, 683 (1978) etc., for example). The higher the crystallinity degree is, the less responsible for the stress transmission the amorphous chain is.

The crystallinity degree is more preferably 62% to 72%, and further preferably from 65% to 70%.

In the polypropylene fiber of the present invention, an endothermic amount of the melting peak measured by the DSC measurement is preferably 85 J/g to 120 J/g.

When the endothermic amount of the melting peak as measured by the DSC measurement is 85 J/g or more, the crystallinity degree is increased, so that the obtained polypropylene fiber has preferably high strength. When it is 120 J/g or less, the amorphous chain greatly contributes to the stress transmission. Therefore, the obtained polypropylene fiber has high strength, which is preferable. From these viewpoints, the endothermic amount of the melting peak by the DSC measurement is more preferably 95 J/g to 110 J/g.

A single fiber fineness of the polypropylene fiber according to the present invention is preferably 3 dtex to 20 dtex. When the single fiber fineness is 3 dtex or higher, processability at the time of processing tends to be favorable. When the single fiber fineness is 20 dtex or lower, the homogeneity of the structure in the fiber tends to be favorable, so that the polypropylene fiber having high strength and high initial elastic modulus can be easily obtained. From the above viewpoint, the single fiber fineness is more preferably 3.5 dtex to 10 dtex, and further preferably 4.0 dtex to 6 dtex.

A total fineness of the polypropylene fiber according to the present invention is preferably 90 dtex to 900 dtex. When the total fineness is 90 dtex or higher, necessary strength can be easily obtained when used for ropes, curing nets, horizontal nets and the like. When it is 900 dtex or lower, weight reduction of ropes, curing nets, horizontal nets, and the like can be easily attained. From these viewpoints, the total fineness is more preferably 120 dtex to 600 dtex, and further preferably 140 dtex to 300 dtex.

In the polypropylene fiber of the present invention, it is preferable that a scattering intensity ratio in the meridian direction with respect to a scattering intensity in the equatorial direction (scattering intensity in the meridian direction/scattering intensity in the equatorial direction) by the small angle X-ray scattering measurement is 0.5 to 0.95, and that the crystalline orientation degree is 90% or higher.

In the polypropylene fiber in which the lamellar structure is laminated, a peak is observed in the meridian direction (fiber axis direction) in the small angle X-ray scattering measurement. That is, the polypropylene fiber obtained by the present invention has a structure in which the ratio of the lamellar structure is small. Since the lamellar structure is weaker in strength than the extended chain structure, the lamellar structure remaining in the polypropylene fiber becomes a factor of lowering the fiber strength.

Further, in the polypropylene fiber containing voids (gaps), scattering in the equatorial direction (perpendicular direction to the fiber) due to the difference in density between fibrous fibrils and voids (gaps) is observed in the small angle X-ray scattering measurement. That is, when the scattering intensity in the equatorial direction increases, voids (gaps) are contained in a large amount, which causes a factor of lowering the fiber strength. In other words, when the scattering intensity ratio is 0.5 or more, there are fewer voids (gaps). Therefore, the fiber strength tends to be high. When it is 0.95 or less, there are fewer lamellar structures. Therefore, the fiber strength tends to be high. From this viewpoint, the scattering intensity ratio is more preferably 0.6 to 0.95, and further more preferably 0.65 to 0.95.

The polypropylene fiber obtained in the present invention preferably has a fiber strength of 7 cN/dtex to 13 cN/dtex. When the fiber strength is 7 cN/dtex or higher, it can be used for ropes, curing nets, horizontal nets and the like, which is preferable because weight reduction can be achieved. On the other hand, although there is no upper limit of the fiber strength, it is currently difficult to industrially obtain the polypropylene fibers having a fiber strength exceeding 13 cN/dtex. From the above viewpoint, the polypropylene fiber of the present invention more preferably has a strength of 8 cN/dtex to 10 cN/dtex, and further preferably 8.5 cN/dtex to 9.5 cN/dtex.

In the polypropylene fiber of the present invention, the crystalline chain and amorphous chain are highly oriented, and therefore, physical properties with high fiber strength can be obtained.

The initial elastic modulus of the polypropylene fiber of the present invention is preferably 100 cN/dtex to 200 cN/dtex. In a case that the initial elastic modulus is 100 cN/dtex or more, when used for ropes, curing nets, horizontal nets and the like, the polypropylene fiber can be reduced in a small amount, and therefore, weight reduction is easy to be achieved. On the other hand, when the initial elastic modulus is 200 cN/dtex or less, it is industrially easy to be obtained. From the above viewpoint, the initial elastic modulus is more preferably 120 cN/dtex to 180 cN/dtex, and further preferably 140 cN/dtex to 160 cN/dtex.

<Others>

Elongation at break of the polypropylene fiber of the present invention is preferably 10% to 30%. When the elongation at break of the polypropylene fiber of the present invention is 10% or more, processability tends to be favorable when processing the polypropylene fiber. On the other hand, when the elongation at break is 30% or less, the shape stability of the obtained processed product tends to be favorable. The elongation at break of the polypropylene fiber of the present invention is more preferably 11% to 25%, and further preferably 12% to 18%.

The polypropylene fiber of the present invention preferably has a crystalline orientation degree of 90% or higher. When the crystalline orientation degree is 90% or higher, the molecular chain responsible for the stress transmission is sufficiently arranged in a fiber axis direction and therefore the fiber strength is less likely to be decreased. From the above viewpoint, the crystalline orientation degree is more preferably 92% or higher, and further preferably 93% or higher.

EXAMPLES

Hereinafter, the present invention will be described more specifically based on Examples 1 to 7 and Comparative Examples 1 to 3, however, the present invention is not limited to the following Examples at all. In these Examples and Comparative Examples, crystalline orientation degree, crystallinity degree, amorphous orientation degree, fiber strength and initial elastic modulus, elongation at break and single fiber fineness were measured by the following methods.

(Melting Point of Polypropylene)

A melting point of the polypropylene resin was calculated using a DSC apparatus (DSC 220 manufactured by SII NanoTechnology Inc.). Polypropylene resin pellets were finely cut and 10 mg of them were put in a sample pan. The measurement was carried out in a nitrogen atmosphere at a heating rate of 10° C./min and from the room temperature to 240° C. The temperature of the peak top of the obtained DSC curve was taken as the melting point.

(Birefringence Value of Undrawn Yarn)

A birefringence value of the undrawn yarn was calculated using a polarizing microscope (ECLIPSE E 600 manufactured by Nikon Corporation). An interference filter was used to have the wavelength of 546 nm, and a retardation measurement was carried out. The birefringence value was calculated by dividing the obtained retardation by a fiber diameter. The fiber diameter was calculated by the fineness and density (0.91 g/cm$^3$) of the undrawn yarn. Five measurements were carried out and the average value was used.

(Scattering Intensity Ratio in Meridian/Equatorial Direction by Small Angle X-Ray Scattering)

A structural analysis of the process yarn at the time of completion of the first stage drawing was carried out by using the small angle X-ray scattering measurement apparatus (Ultrax 18, wavelength λ=1.54 Å, manufactured by Rigaku Corporation) and the DSC measurement apparatus (DSC 220 manufactured by SII NanoTechnology Inc.). In the small angle X-ray scattering measurement, the undrawn yarn was cut into approximately 5 cm and adjusted to be 50 mg. Fibers were aligned in one axis direction and attached to the sample holder. The measurement was carried out at the tube voltage of 40 kv, the tube current of 200 mA, and an irradiation time of 30 minutes. Regarding the obtained two-dimensional diffraction image, in the equatorial direction, a one-dimensional profile of was obtained in a range of 2θ=0.2° to 2°. In the meridian direction, a one-dimensional profile of a range of β=160° to 200° was obtained in a range of 2θ=0.2° to 2°. For each 2θ, a maximum value obtained by dividing the one-dimensional profile in the meridian direction by the one-dimensional profile in the equatorial direction was taken as the intensity ratio in the meridian direction with respect to the intensity in the equatorial direction (intensity ratio by the small angle X-ray scattering).

(DSC Peak Ratio)

The DSC measurement of the process yarn at the time of completion of the first stage drawing was carried out by finely cutting the polypropylene process yarn and putting 10 mg into the sample pan. The measurement was carried out in a nitrogen atmosphere at a heating rate of 10° C./min and from the room temperature to 240° C. With respect to the obtained DSC profile, peaks were set between 168° C. and 174° C. and between 160° C. and 166° C., respectively, and waveform separation was performed to calculate the area ratio. For the function used for the waveform separation, Pseudo-Voigt function which is a superposition of Gaussian function and Lorenz function is used, and the ratio of the Gaussian function and the Lorenz function is fixed at 1:1.

The DSC peak ratio was a value obtained by dividing the area of the melting peak at 160° C. to 166° C. by the area of the melting peak at 168° C. to 174° C.

(Ratio of Crystalline Structure)

A structural analysis of the undrawn yarn was carried out using the wide angle X-ray diffraction measurement apparatus (Ultrax 18, wavelength λ=1.54 Å, manufactured by Rigaku Corporation). The undrawn yarn was cut into approximately 5 cm and adjusted to be 30 mg. Fibers were aligned in one axis direction and attached to the sample holder. The measurement was carried out at the tube voltage or 40 kV, the tube current of 200 mA, and the irradiation time of 30 minutes.

The one-dimensional profile in all directions were cut out from the obtained two-dimensional diffraction image, and the background was subtracted to obtain a final one-dimensional profile. The ratio of the crystalline component was measured by the above-described method. For the fitted peak function, Pseudo-Voigt function which is a superposition of Gaussian function and Lorenz function is used and the ratio of the Gaussian function and the Lorentz function is fixed at 1:1.

<Method for Measuring Crystalline Orientation Degree and Crystallinity Degree>

The crystalline orientation degree and crystallinity degree of the polypropylene fiber were measured using the wide angle X-ray diffraction measurement apparatus (Ultrax 18, wavelength $\lambda$=1.54 Å, manufactured by Rigaku Corporation). The drawn yarn was cut into approximately 5 cm and adjusted to be 30 mg. Fibers were aligned in one axis direction and attached to the sample holder. The measurement was carried out at the tube voltage of 40 kV, the tube current of 200 mA, and the irradiation time of 30 minutes.

For the obtained two-dimensional diffraction image, a one-dimensional profile in 2θ direction was cut out in a range of β=175° to 185°, and the background was subtracted to obtain a final one-dimensional profile. Peaks were set at diffraction angles of 14.1°, 16.9°, 18.6°, 21.6° (crystalline component) and 16° (amorphous component), respectively, and a waveform separation was performed. The crystallinity degree was calculated by dividing the sum of the peak integral intensities of the crystalline component by all the peak integral intensities. For the fitted peak function, Pseudo-Voigt function which is a superposition of Gaussian function and Lorenz function is used and the ratio of the Gaussian function and the Lorentz function is fixed at 1:1.

For the obtained two-dimensional image, a one-dimensional profile in a β direction was cut out in a range of 2θ=16° to 17.5°, and from a half value width α of the peak at β=90°, the crystalline orientation degree=(180−α)×100/180 was calculated.

<Method of Measuring Amorphous Orientation Degree>

The amorphous orientation degree, fa, of fibers, can be obtained by using an expression of fa=[Δn−Δnc0·fc·χc]/[(1−χc)·Δna0]×100%. The Δn is an actually measured birefringence value, the Δnc0 is a crystal intrinsic birefringence, and $33.1×10^{-3}$ is inserted. The Δna0 is an amorphous intrinsic birefringence, and $46.8×10^{-3}$ is inserted. The fc is a crystalline orientation degree, and the χc is a crystallinity degree. Values obtained by the wide angle X-ray diffraction measurement are used respectively. The birefringence value was calculated using a polarizing microscope (ECLIPSE E 600 manufactured by Nikon Corporation). An interference filter was used so as to have the wavelength of 546 nm, and a retardation measurement was carried out. The birefringence value was calculated by dividing the obtained retardation by a fiber diameter. The fiber diameter was calculated by the fineness and density (0.91 g/cm$^3$) of the undrawn yarn. Five measurements were carried out and the average value was used.

(Scattering Intensity Ratio in Meridian/Equatorial Direction by Small Angle X-Ray Scattering)

The scattering intensity ratio in the meridian direction with respect to the scattering intensity in the equatorial direction of the polypropylene fiber by the small angle X-ray scattering measurement was calculated by a synchrotron radiation X-ray measurement (SPrin-8 BL 03 XU, wavelength 1 Å). A two-dimensional scattering image was obtained by a detector: CCD, camera length: 4.0 m, and exposure time: 2 seconds. The polypropylene fiber was cut so as to have a size of about 5 cm and adjusted to be 10 mg to 50 mg. Fibers were aligned in one axis direction and attached to the sample holder. The analysis method was carried out by the same method as the scattering intensity ratio of the process yarns described above.

<Method for Measuring Single Fiber Fineness and Total Fineness>

A value obtained by sampling a polypropylene fiber bundle of 100 m and multiplying its mass (g) by 100 was taken as the total fineness. The single fiber fineness was calculated by dividing the total fineness by the number of filaments.

<Method for Measuring Fiber Strength, Initial Elastic Modulus, and Elongation at Break>

The fiber strength, the initial elastic modulus, and the elongation at break were measured in accordance with JIS L 1013. Using a tensile tester (AG-IS manufactured by Shimadzu Corporation) under conditions of a sample length of 200 mm and a tensile speed of 100 mm/min, strain-stress curves were measured under conditions of an atmosphere temperature of 20° C. and a relative humidity of 65%. The elongation at break was determined by the value of the rupture point, and the strength was determined by the stress at the rupture point. The initial elastic modulus was calculated by the inclination of the strain-stress curve. Five measurements were carried out and the average value was used.

Various production conditions and properties of the polypropylene fibers in Examples 1 to 7 and Comparative Examples 1 to 3 are shown in Table 1.

Example 1

Polypropylene resin (Y2000 GV, melting point of resin: 163.4° C., MFR=18 g/10 minutes (230° C., load: 2.16 kg, 10 min) manufactured by Prime Polymer Co., Ltd.) was charged into an extruder of a melt spinning apparatus, heated up to 280° C. to be melt kneaded, and discharged from a spinning nozzle having a discharge hole diameter of 0.5 mmφ and a discharge hole number of 36 holes at a mass flow of 45.3 g/min (1.26 g/min per hole). After cooling and solidifying by applying cold air at 20° C., an oil agent was applied, and the yarn was wound around a bobbin at a winding speed of 300 m/min to obtain an undrawn yarn having a crystalline structure ratio of 0 mass %, a mesostructure ratio of 49.1 mass %, an amorphous structure ratio of 50.9 mass % and a birefringence value of $0.74×10^{-3}$.

With respect to the obtained undrawn yarn, preheating was carried out using the hot roll so as to have the yarn temperature of 85° C., and a hot plate drawing was performed in a first stage drawing at the yarn temperature of 145° C. and a draw ratio of 8 times. Preheating was continuously carried out further with the hot roll so as to have the yarn temperature of 120° C., and the hot plate drawing was performed in a second stage drawing at the yarn temperature of 155° C., the draw ratio of 1.20 times and a drawing velocity of 300 m/min to obtain a polypropylene fiber. The deformation rate and the drawing tension are as shown in Table 1.

The strength and initial elastic modulus of the obtained polypropylene fiber are as shown in Table 1, and the polypropylene fiber having high strength and high initial elastic modulus was obtained. The elongation at break, fineness, crystalline orientation degree, amorphous orientation degree, and crystallinity degree of the polypropylene fiber are as shown in Table 1, and the fiber structure was highly oriented.

Example 2

As shown in Table 1, a polypropylene fiber was obtained in the same manner as in Example 1 except that the yarn temperature was set to be 165° C. in the second stage drawing process. The deformation rate and the drawing tension are as shown in Table 1. The strength and initial elastic modulus of the obtained polypropylene fiber are as shown in Table 1, and a fiber having high strength and high initial elastic modulus was obtained. The elongation at break, fineness, crystalline orientation degree, amorphous orientation degree, and crystallinity degree are as shown in Table 1, and the fiber structure was highly oriented.

Example 3

As shown in Table 1, a polypropylene fiber was obtained in the same manner as in Example 1 except that the yarn temperature was set to be 165° C. and the draw ratio was set to be 1.35 times in the second stage drawing process. The deformation rate and the drawing tension are as shown in Table 1. The strength and initial elastic modulus of the obtained polypropylene fiber are as shown in Table 1, and a fiber having high strength and high initial elastic modulus was obtained. The elongation at break, fineness, crystalline orientation degree, amorphous orientation degree, and crystallinity degree are as shown in Table 1, and the fiber structure was highly oriented.

Example 4

As shown in Table 1, a polypropylene fiber was obtained in the same manner as in Example 1 except that the yarn temperature was set to be 175° C. and the draw ratio was set to be 1.35 times in the second stage drawing process. The deformation rate and the drawing tension are as shown in Table 1. The strength and initial elastic modulus of the obtained polypropylene fiber are as shown in Table 1, and a fiber having high strength and high initial elastic modulus was obtained. The elongation at break, fineness, crystalline orientation degree, amorphous orientation degree, and crystallinity degree are as shown in Table 1, and the fiber structure was highly oriented.

Example 5

As shown in Table 1, a polypropylene fiber was obtained in the same manner as in Example 1 except that the yarn temperature was set to be 135° C. and the draw ratio was set to be 6 times in the first stage drawing process and that the yarn temperature was set to be 165° C. and the draw ratio was set to be 1.66 times in the second stage drawing process. The deformation rate and the drawing tension are as shown in Table 1. The strength and initial elastic modulus of the obtained polypropylene fiber are as shown in Table 1, and a fiber having high strength and high initial elastic modulus was obtained. The elongation at break, fineness, crystalline orientation degree, amorphous orientation degree, and crystallinity degree are as shown in Table 1, and the fiber structure was highly oriented.

Example 6

As shown in Table 1, a polypropylene fiber Was obtained in the same manner as in Example 1 except that the yarn temperature was set to be 175° C. in the second stage drawing process. The deformation rate and the drawing tension were as shown in Table 1. The strength and initial elastic modulus of the obtained polypropylene fiber are as shown in Table 1, and a fiber having high strength and high initial elastic modulus was obtained. The elongation at break, fineness, crystalline orientation degree, amorphous orientation degree, and crystallinity degree are as shown in Table 1, and the fiber structure was highly oriented.

Example 7

As shown in Table 1, a polypropylene fiber was obtained in the same manner as in Example 1 except that the yarn temperature was set to be 185° C. in the second stage drawing process. The deformation rate and the drawing tension were as shown in Table 1. The strength and initial elastic modulus of the obtained polypropylene fiber are as shown in Table 1, and a fiber having high strength and high initial elastic modulus was obtained. The elongation at break, fineness, crystalline orientation degree, amorphous orientation degree, and crystallinity degree are as shown in Table 1, and the fiber structure was highly oriented.

Comparative Example 1

As shown in Table 1, a polypropylene fiber was obtained in the same manner as in Example 1 except that the yarn temperature was set to be 135° C. and the draw ratio was set to be 6 times in the first stage drawing process, and that the yarn temperature was set to be 175° C. and the draw ratio was set to be 1.50 times in the second stage drawing process. The deformation rate and the drawing tension are as shown in Table 1. The strength and initial elastic modulus of the obtained polypropylene fiber are as shown in Table 1, and high strength fiber was not obtained. The elongation at break, fineness, crystalline orientation degree, amorphous orientation degree, and crystallinity degree are as shown in Table 1, which resulted in low amorphous orientation degree.

Comparative Example 2

As shown in Table 1, a polypropylene fiber was obtained in the same manner as in Example 1 except that the yarn temperature was set to be 155° C. and the draw ratio was set to be 6 times in the first stage drawing process, and that the yarn temperature was set to be 165° C. in the second stage drawing process. The deformation rate and the drawing tension are as shown in Table 1, and the drawing tension was low in the second stage drawing. The strength and initial elastic modulus of the obtained polypropylene fiber are as shown in Table 1, and a fiber having high strength and high initial elastic modulus was not obtained. The elongation at break, fineness, crystalline orientation degree, amorphous orientation degree, and crystallinity degree are as shown in Table 1, which resulted in low amorphous orientation degree.

Comparative Example 3

As shown in Table 1, a polypropylene fiber was obtained in the same manner as is Example 1 except that the draw ratio was set to be 4 times in the first stage drawing process, and that the yarn temperature was set to be 165° C. and the draw ratio was set to be 1.80 times, in the second stage drawing process. The deformation rate and the drawing tension are as shown in Table 1, and the drawing tension was low in the second stage drawing. The strength and initial elastic modulus of the obtained polypropylene fiber are as shown in Table 1, and a fiber having high strength and high initial elastic modulus was not obtained. The elongation at break, fineness, crystalline orientation degree, amorphous orientation degree, and crystallinity degree are as shown in Table 1, which resulted in low amorphous orientation degree.

gence value of the undrawn yarn was $1.30 \times 10^{-3}$, and the ratio of the crystalline structure was 0 mass %. A maximum draw ratio at break at 155° C. of this undrawn yarn was 11.6 times. When it is drawn at the preheating temperature of 85° C., the hot plate temperature of 155° C., 0.7 times of the maximum draw ratio at break, and the velocity of 300 m/min, the strength of the obtained polypropylene fiber was 7.9 cN/dtex, as shown in Table 2.

Example 9

Polypropylene resin (Y2000 GV, melting point of resin: 169.4° C., MFR=18 g/10 min [230° C., load: 2.16 kg, 10

TABLE 1

| | First stage drawing condition | | | Second stage drawing condition | | | Drawing tention at the time of final drawing cN/dtex | Fiber physical property | | |
|---|---|---|---|---|---|---|---|---|---|---|
| | Yarn temperature ° C. | Draw ratio times | Deformation rate l/sec | Yarn temperature ° C. | Draw ratio times | Deformation rate l/sec | | Total Draw ratio times | Strength cN/dtex | Initial elastic modulus cN/dtex |
| Example 1 | 145 | 8 | 12.2 | 155 | 1.2 | 2.78 | 2.87 | 9.6 | 8.53 | 129.9 |
| Example 2 | 145 | 8 | 12.2 | 165 | 1.2 | 2.78 | 2.31 | 9.6 | 8.54 | 127.6 |
| Example 3 | 145 | 8 | 10.8 | 165 | 1.35 | 4.32 | 3.23 | 10.8 | 9.10 | 159.2 |
| Example 4 | 145 | 8 | 10.8 | 175 | 1.35 | 4.32 | 2.74 | 10.8 | 8.64 | 149.8 |
| Example 5 | 135 | 6 | 8.4 | 165 | 1.66 | 6.63 | 2.46 | 10.0 | 8.35 | 140.5 |
| Example 6 | 145 | 8 | 12.2 | 175 | 1.2 | 2.78 | 1.62 | 9.6 | 7.39 | 118.6 |
| Example 7 | 145 | 8 | 12.2 | 185 | 1.2 | 2.78 | 1.50 | 9.6 | 7.78 | 121.0 |
| Comparative Example 1 | 135 | 6 | 9.3 | 175 | 1.5 | 5.56 | 1.49 | 9.0 | 6.91 | 108.6 |
| Comparative Example 2 | 155 | 6 | 11.6 | 165 | 1.2 | 2.78 | 1.03 | 7.2 | 6.50 | 82.3 |
| Comparative Example 3 | 145 | 4 | 69 | 165 | 1.8 | 7.41 | 0.98 | 7.2 | 4.53 | 65.4 |

| | Fiber physical property | | | | | | | |
|---|---|---|---|---|---|---|---|---|
| | Elongation at break % | Total finess dtex | Single fiber finess dtex | Crystallinity degree % | Crystalline orientation degree % | Amorphous orientation degree % | Endothermic energy amount at melting peak by DSC measurement J/g | Scattering intensity ratio in meridian/ equatorial direction |
| Example 1 | 16.4 | 159.8 | 4.4 | 67.7 | 93.2 | 98.4 | 111 | 0.69 |
| Example 2 | 17.1 | 158.7 | 4.4 | 69.1 | 94.3 | 99.8 | 107 | 0.73 |
| Example 3 | 13.1 | 141.4 | 3.9 | 66.1 | 95.2 | 91.8 | 109 | 0.66 |
| Example 4 | 13.4 | 140.2 | 3.9 | 65.3 | 96.0 | 90.2 | 110 | 0.67 |
| Example 5 | 15.0 | 153.5 | 4.3 | 70.9 | 95.9 | 97.3 | 108 | 0.78 |
| Example 6 | 13.9 | 156.7 | 4.4 | 72.5 | 96.6 | 86.7 | 110 | 0.88 |
| Example 7 | 15.3 | 157.8 | 4.4 | 71.8 | 95.1 | 88.9 | 112 | 0.94 |
| Comparative Example 1 | 16.3 | 167.3 | 4.6 | 75.5 | 95.8 | 83.9 | 110 | 0.99 |
| Comparative Example 2 | 21.5 | 209.9 | 5.8 | 76.0 | 95.1 | 81.9 | 107 | 1.39 |
| Comparative Example 3 | 14.7 | 210.5 | 5.8 | 76.3 | 92.1 | 74.7 | 108 | 1.81 |

Example 8

Polypropylene resin (Y2000 GV, melting point of resin: 169.4° C., MFR=18 g/10 min [230° C., load: 2.16 kg, 10 min] manufactured by Prime Polymer Co., Ltd.) was charged into an extruder of a melt spinning apparatus, melt kneaded at 280° C., and discharged at a mass flow of 34 g/min (1.4 g/min per hole) from a nozzle (0.4 mmφ, 24 holes) at 280° C. After cooling and solidifying by applying cold air at 20° C., an oil agent was adhered, and the yarn was wound around a bobbin at a take-up speed of 300 m/min at room temperature to obtain an undrawn yarn. The birefrinmin] manufactured by Prime Polymer Co., Ltd.) was charged into an extruder of a melt spinning apparatus, melt kneaded at 280° C., and discharged at a mass flow of 30 g/min (1.5 g/min per hole) from a nozzle (0.8 mmφ, 20 holes) at 280° C. After cooling and solidifying by applying cold air at 20° C., an oil agent was adhered and the yarn was wound around a bobbin at a take-up speed of 300 m/min at room temperature to obtain an undrawn yarn. The birefringence value of the undrawn yarn was $0.92 \times 10^{-3}$, and the ratio of the crystalline structure was 0 mass %. A maximum draw ratio at break at 155° C. of this undrawn yarn was 11.4 times. When it is drawn at the preheating temperature of 85° C., the hot plate temperature of 155° C., 0.7 times of the maximum draw ratio at break, and the velocity of 300 m/min, the strength of the obtained polypropylene fiber was 7.7 cN/dtex, as shown in Table 2.

Example 10

Polypropylene resin (Y2000 GV, melting point of resin: 169.4° C., MFR=18 g/10 min [230° C., load: 2.16 kg, 10 min] manufactured by Prime Polymer Co., Ltd.) was charged into an extruder of a melt spinning apparatus, melt kneaded at 280° C., and discharged at a mass flow of 46 g/min (2.3 g/min per hole) from a nozzle (0.5 mmφ, 20 holes) at 280° C. After cooling and solidifying by applying cold air at 20° C., an oil agent was adhered, and the yarn was wound around a bobbin at a take-up speed of 300 m/min at room temperature to obtain an undrawn yarn. The birefringence value of the undrawn yarn was $0.88 \times 10^{-3}$, and the ratio of the crystalline structure was 0 mass %. A maximum draw ratio at break at 155° C. of this undrawn yarn was 11.9 times. When it is drawn at the preheating temperature of 85° C., the hot plate temperature of 155° C., 0.7 times of the maximum draw ratio at break, and the velocity of 300 m/min, the strength of the obtained polypropylene fiber was 7.4 cN/dtex, as shown in Table 2.

Example 11

Polypropylene resin (Y2000 GV, melting point of resin: 169.4° C., MFR=18 g/10 min [230° C., load: 2.16 kg, 10 min] manufactured by Prime Polymer Co., Ltd.) was charged into an extruder of a melt spinning apparatus, melt kneaded at 280° C., and discharged at a mass flow of 30 g/min (1.5 g/min per hole) from a nozzle (0.5 mmφ, 20 holes) at 280° C. After cooling and solidifying by applying cold air at 20° C., an oil agent was adhered, and the yarn was wound around a bobbin at a take-up speed of 300 m/min at room temperature to obtain an undrawn yarn. The birefringence value of the undrawn yarn was $0.88 \times 10^{-3}$, and the ratio of the crystalline structure was 0 mass %. A maximum draw ratio at break at 135° C. of this undrawn yarn was 10.3 times. When it is drawn at the preheating temperature of 85° C., the hot plate temperature of 135° C., 0.7 times of the maximum draw ratio at break, and the velocity of 300 m/min, the strength of the obtained polypropylene fiber was 7.3 cN/dtex, as shown in Table 2.

Example 12

Polypropylene resin (Y2000 GV, melting point of resin: 169.4° C., MFR=18 g/10 min [230° C., load: 2.16 kg, 10 min] manufactured by Prime Polymer Co., Ltd.) was charged into an extruder of a melt spinning apparatus, melt kneaded at 280° C., and discharged at a mass flow of 30 g/min (1.5 g/min per hole) from a nozzle (0.5 mmφ, 20 holes) at 280° C. After cooling and solidifying by applying cold air at 20° C., an oil agent was adhered, and the yarn was wound around a bobbin at a take-up speed of 300 m/min at room temperature to obtain an undrawn yarn. The birefringence value of the undrawn yarn was $0.88 \times 10^{-3}$, and the ratio of the crystalline structure was 0 mass %. A maximum draw ratio at break at 155° C. of this undrawn yarn was 10.9 times. When it is drawn at the preheating temperature of 85° C., the hot plate temperature of 155° C., 0.7 times of the maximum draw ratio at break, and the velocity of 300 m/min, the strength of the obtained polypropylene fiber was 7.1 cN/dtex, as shown in Table 2.

Example 13

Polypropylene resin (Y2000 GV, melting point of resin: 169.4° C., MFR=18 g/10 min [230° C., load: 2.16 kg, 10 min] manufactured by Prime Polymer Co., Ltd.) was charged into an extruder of a melt spinning apparatus, melt kneaded at 280° C., and discharged at a mass flow of 46 g/min (2.3 g/min per hole) from a nozzle (0.3 mmφ, 20 holes) at 280° C. After cooling and solidifying by applying cold air at 20° C., an oil agent was adhered, and the yarn was wound around a bobbin at a take-up speed of 300 m/min at room temperature to obtain an undrawn yarn. The birefringence value of the undrawn yarn was $0.76 \times 10^{-3}$, and the ratio of the crystalline structure was 0 mass %. A maximum draw ratio at break at 155° C. of this undrawn yarn was 11.6 times. When it is drawn at the preheating temperature of 85° C., the hot plate temperature of 155° C., 0.7 times of the maximum draw ratio at break, and the velocity of 300 m/min, the strength of the obtained polypropylene fiber was 7.1 cN/dtex, as shown in Table 2.

Example 14

Polypropylene resin (Y2000 GV, melting point of resin: 169.4° C., MFR=18 g/10 min [230° C., load: 2.16 kg, 10 min] manufactured by Prime Polymer Co., Ltd.) was charged into an extruder of a melt spinning apparatus, melt kneaded at 280° C. and discharged at a mass flow of 34 g/min (1.4 g/min per hole) from a nozzle (0.4 mmφ, 24 holes) at 280° C. After cooling and solidifying by applying cold air at 20° C., an oil agent was adhered, and the yarn was wound around a bobbin at a take-up speed of 300 m/min at room temperature to obtain an undrawn yarn. The birefringence value of the undrawn yarn was $1.30 \times 10^{-3}$, and the ratio of the crystalline structure was 0 mass %. A maximum draw ratio at break at 135° C. of this undrawn yarn was 10.4 times. When it is drawn at the preheating temperature of 85° C., the hot plate temperature of 135° C., 0.7 times of the maximum draw ratio at break, and the velocity of 300 m/min, the strength of the obtained polypropylene fiber was 7.1 cN/dtex, as shown in Table 2.

Example 15

Polypropylene resin (Y2000 GV, melting point of resin: 169.4° C., MFR=18 g/10 min [230° C., load: 2.16 kg, 10 min] manufactured by Prime Polymer Co., Ltd.) was charged into an extruder of a melt spinning apparatus, melt kneaded at 280° C., and discharged at a mass flow of 46 g/min (2.3 g/min per hole) from a nozzle (0.5 mmφ, 20 holes) at 280° C. After cooling and solidifying by applying cold air at 20° C., an oil agent was adhered, and the yarn was wound around a bobbin at a take-up speed of 300 m/min at room temperature to obtain an undrawn yarn. The birefringence value of the undrawn yarn was $0.88 \times 10^{-3}$, and the ratio of the crystalline structure was 0 mass %. A maximum draw ratio at break at 135° C. of this undrawn yarn was 10.9 times. When it is drawn at the preheating temperature of 85° C., the hot plate temperature of 135° C., 0.7 times of the maximum draw ratio at break, and the velocity of 300 m/min, the strength of the obtained polypropylene fiber was 6.9 cN/dtex, as shown in Table 2.

Example 16

Polypropylene resin (Y2000 GV, melting point of resin: 169.4° C., MFR=18 g/10 min [230° C., load: 2.16 kg, 10 min] manufactured by Prime Polymer Co., Ltd.) was charged into an extruder of a melt spinning apparatus, melt kneaded at 250° C., and discharged at a mass flow of 30 g/min (1.5 g/min per hole) from a nozzle (0.3 mmφ, 20 holes) at 250° C. After cooling and solidifying by applying cold air at 20° C., an oil agent was adhered, and the yarn was wound around a bobbin at a take-up speed of 300 m/min at room temperature to obtain an undrawn yarn. The birefringence value of the undrawn yarn was $2.02 \times 10^{-3}$, and the ratio of the crystalline structure was 16.0 mass %. A maximum draw ratio at break at 155° C. of this undrawn yarn was 10.1 times. When it is drawn at the preheating temperature of 85° C., the hot plate temperature of 155° C., 0.7 times of the maximum draw ratio at break, and the velocity of 300 m/min, the strength of the obtained polypropylene fiber was 7.3 cN/dtex, as shown in Table 2.

Example 17

Polypropylene resin (Y2000 GV, melting point of resin: 169.4° C., MFR=18 g/10 min [230° C., load: 2.16 kg, 10 min] manufactured by Prime Polymer Co., Ltd.) was charged into an extruder of a melt spinning apparatus, melt kneaded at 280° C., and discharged at a mass flow of 30 g/min (1.5 g/min per hole) from a nozzle (0.3 mmφ, 20 holes) at 280° C. After cooling and solidifying by applying cold air at 20° C., an oil agent was adhered, and the yarn was wound around a bobbin at a take-up speed of 600 m/min at room temperature to obtain an undrawn yarn. The birefringence value of the undrawn yarn was $3.15 \times 10^{-3}$, and the ratio of the crystalline structure was 0 mass %. A maximum draw ratio at break at 135° C. of this undrawn yarn was 9.3 times. When it is drawn at the preheating temperature of 85° C., the hot plate temperature of 135° C., 0.7 times of the maximum draw ratio at break, and the velocity of 300 m/min, the strength of the obtained polypropylene fiber was 6.7 cN/dtex, as shown in Table 2.

Comparative Example 4

Polypropylene resin (SA01A, melting point of resin: 168.3° C., MFR=10 g/10 min [230° C., load: 2.16 kg, 10 min] manufactured by Japan Polypropylene Corporation) was charged into an extruder of a melt spinning apparatus, melt kneaded at 280° C., and discharged at a mass flow of 34 g/min (1.4 g/min per hole) from a nozzle (0.4 mmφ, 24 holes) at 280° C. After cooling and solidifying by applying cold air at 20° C., an oil agent was adhered, and the yarn was wound around a bobbin at a take-up speed of 300 m/min at room temperature to obtain an undrawn yarn. The birefringence value of the undrawn yarn was $2.36 \times 10^{-3}$, and the ratio of the crystalline structure was 46.0 mass %. A maximum draw ratio at break at 135° C. of this undrawn yarn was 9.3 times. When it is drawn at the preheating temperature of 85° C., the hot plate temperature of 135° C., 0.7 times of the maximum draw ratio at break, and the velocity of 300 m/min, the strength of the obtained polypropylene fiber was as low as 6.7 cN/dtex, as shown in Table 2. This is presumably because the MFR was as low as 10 g/10 min, the melt viscosity was high, and the tension of the resin on the spinning line became high, and consequently, the ratio of the crystalline structure of the obtained undrawn yarn increased, and the oriented crystallization of α crystal was promoted.

Comparative Example 5

Polypropylene resin (SA03A, melting point of resin: 168.7° C., MFR=30 g/10 min [230° C., load: 2.16 kg, 10 min] manufactured by Japan Polypropylene Corporation) was charged into an extruder of a melt spinning apparatus, melt kneaded at 280° C., and discharged at a mass flow of 34 g/min (1.4 g/min per hole) from a nozzle (0.4 mmφ, 24 holes) at 280° C. After cooling and solidifying by applying cold air at 20° C., an oil agent was adhered, and the yarn was wound around a bobbin at a take-up speed of 300 m/min at room temperature to obtain an undrawn yarn. The birefringence value of the undrawn yarn was $1.06 \times 10^{-3}$, and the ratio of the crystalline structure was 40.1 mass %. A maximum draw ratio at break at 135° C. of the undrawn yarn was 11.2 times. When it is drawn at the preheating temperature of 85° C., the hot plate temperature of 135° C., 0.7 times of the maximum draw ratio at break, and the velocity of 300 m/min, the strength of the obtained polypropylene fiber was 6.5 cN/dtex as shown in Table 2, which was lower than any of the above Examples 8 to 17. It is considered that despite the birefringence value was low, the desired strength was not able to be obtained because the crystalline structure was α crystal and the MFR was extremely high.

Comparative Example 6

Polypropylene resin (Y2000 GV, melting point of resin: 169.4° C., MFR=18 g/10 min [230° C., load: 2.16 kg, 10 min] manufactured by Prime Polymer Co., Ltd.) was charged into an extruder of a melt spinning apparatus, melt kneaded at 220° C., and discharged at a mass flow of 30 g/min (1.5 g/min per hole) from a nozzle (0.3 mmφ, 20 holes) at 220° C. After cooling and solidifying by applying cold air at 20° C., an oil agent was adhered, and the yarn was wound around a bobbin at a take-up speed of 300 m/min at room temperature to obtain an undrawn yarn. The birefringence value of the undrawn yarn was $3.32 \times 10^{-3}$, and the ratio of the crystalline structure was 42.4 mass %. A maximum draw ratio at break at 155° C. of this undrawn yarn was 8.8 times. When it is drawn at the preheating temperature of 85° C., the hot plate temperature of 155° C., 0.7 times of the maximum draw ratio at break, and the velocity of 300 m/min, the strength of the obtained polypropylene fiber was 6.5 cN/dtex, as shown in Table 2. It is considered that despite the MFR is within the definition of the present invention, the strength of the obtained polypropylene fiber was as low as that of Comparative Example 5 since the spinning temperature was too low compared with other Examples and the birefringence value became too large.

TABLE 2

| | Spinning condition of undrawn yarn | | | | | | | | |
|---|---|---|---|---|---|---|---|---|---|
| | Spinning | | | | | | | Undrawn yarn | |
| | MFR (g/min) | Spinning temperature (° C.) | Resin melting point (° C.) | Spinning temperature − resin melting point (° C.) | 1 hole mass flow (g/min) | Spinning draft (times) | Take-up speed (m/min) | Birefringence value (×10⁻³) | Crystalline structure ratio (%) |
| Example 8 | 18 | 280 | 169.4 | 110.6 | 1.4 | 22 | 300 | 1.30 | 0 |
| Example 9 | 18 | 280 | 169.4 | 110.6 | 1.5 | 12 | 300 | 0.93 | 0 |

TABLE 2-continued

| | | | | | | | | | |
|---|---|---|---|---|---|---|---|---|---|
| Example 10 | 18 | 280 | 169.4 | 110.6 | 2.3 | 8 | 300 | 0.88 | 0 |
| Example 11 | 18 | 280 | 169.4 | 110.6 | 1.5 | 12 | 300 | 0.88 | 0 |
| Example 12 | 18 | 280 | 169.4 | 110.6 | 1.5 | 12 | 300 | 0.88 | 0 |
| Example 13 | 18 | 280 | 169.4 | 110.6 | 2.3 | 8 | 300 | 0.76 | 0 |
| Example 14 | 18 | 280 | 169.4 | 110.6 | 1.4 | 22 | 300 | 1.30 | 0 |
| Example 15 | 18 | 280 | 169.4 | 110.6 | 2.3 | 12 | 300 | 0.88 | 6 |
| Example 16 | 18 | 250 | 169.4 | 80.6 | 1.5 | 12 | 300 | 2.02 | 16.0 |
| Example 17 | 18 | 280 | 169.4 | 110.6 | 1.5 | 24 | 600 | 31.5 | 0 |
| Comparative Example 4 | 10 | 280 | 168.3 | 111.7 | 1.4 | 22 | 300 | 2.36 | 46.0 |
| Comparative Example 5 | 30 | 280 | 168.7 | 111.3 | 1.4 | 22 | 300 | 1.06 | 40.1 |
| Comparative Example 6 | 18 | 220 | 169.4 | 50.6 | 1.5 | 12 | 300 | 3.32 | 42.4 |

| | Undrawn yarn | | Drawing condition of undrawn yarn | | | Drawn yarn | | |
|---|---|---|---|---|---|---|---|---|
| | Meso-structure ratio (%) | Amorphous structure ratio (%) | Drawing temperature (° C.) | Draw ratio | Ratio at break | Single fiber fineness (dtex) | Strength (cN/dtex) | Elongation (%) |
| Example 8 | 54.3 | 45.7 | 155 | 8.1 | 11.6 | 5.3 | 7.9 | 23.4 |
| Example 9 | 52.3 | 47.7 | 155 | 8.0 | 11.4 | 5.5 | 7.7 | 16.6 |
| Example 10 | 49.6 | 50.4 | 155 | 8.3 | 11.9 | 7.8 | 7.4 | 15.3 |
| Example 11 | 57.6 | 42.4 | 135 | 7.2 | 10.3 | 6 | 7.3 | 18 |
| Example 12 | 57.6 | 42.4 | 155 | 7.6 | 10.9 | 5.7 | 7.1 | 16.4 |
| Example 13 | 55.0 | 45.0 | 155 | 8.1 | 11.6 | 8.1 | 7.1 | 15.3 |
| Example 14 | 54.3 | 45.7 | 135 | 7.3 | 10.4 | 5.9 | 7.1 | 23.8 |
| Example 15 | 49.6 | 50.4 | 135 | 7.6 | 10.9 | 8.6 | 6.9 | 17.7 |
| Example 16 | 48.0 | 36.0 | 155 | 7.1 | 10.1 | 6.4 | 7.3 | 18.3 |
| Example 17 | 58.0 | 42.0 | 135 | 6.5 | 9.3 | 3.3 | 6.7 | 20.2 |
| Comparative Example 4 | 0.0 | 54.0 | 135 | 6.5 | 9.3 | 6.3 | 6.7 | 29.2 |
| Comparative Example 5 | 0.0 | 59.9 | 135 | 7.8 | 11.2 | 5.5 | 6.5 | 21.6 |
| Comparative Example 6 | 0.0 | 57.6 | 155 | 6.2 | 8.8 | 7.3 | 6.5 | 18.2 |

Example 18

Polypropylene resin (Y2000 GV, MFR=18 g/10 min [230° C., load: 2.16 kg, 10 min] manufactured by Prime Polymer Co., Ltd.) was charged into an extruder of a melt spinning apparatus, heated up to 280° C. and melt kneaded, and discharged at a mass flow of 30 g/min (1.5 g/min per hole) from a spinning nozzle having 20 discharge holes in which each discharge hole diameter is 0.5 mmφ. After cooling and solidifying by applying cold air at 20° C., an oil agent was adhered, and wound around a bobbin with a take-up speed of 300 m/min to obtain an undrawn yarn. This undrawn yarn has a crystalline structure ratio of 0%, a meso-structure ratio of 57.6%, an amorphous structure ratio of 42.4%, and a birefringence value of $0.88 \times 10^{-3}$, which was low in crystallinity and orientation.

With respect to the obtained undrawn yarn, preheating was carried out using the hot roll so as to have the yarn temperature of 85° C., and the hot plate drawing was performed in a first stage drawing at 9.1 times at a yarn temperature of 145° C., as shown in Table 4. Further, preheating was carried out continuously with the hot roll so as to have the yarn temperature of 120° C. further, and the hot plate drawing was performed in a second stage drawing at 1.1 times, at the yarn temperature at 165° C., a deformation rate of 1.52 (1/sec), and a drawing tension of 2.79 cN/dtex. As shown in Table 4, the drawing velocity in a final stage was 300 m/min. The obtained fiber had a strength of 9.4 cN/dtex, an initial elastic modulus of 142 cN/dtex, and a fiber having high strength and high initial elastic modulus was obtained. The elongation at break was 16.2%, and the single fiber fineness was 4.4 dtex.

Examples 19 to 22

Polypropylene fibers were obtained using the same undrawn yarn as in Example 18 and in the same manner as in Example 18 except that the draw ratio of the first stage, the draw ratio of the second stage, the deformation rate, and the drawing tension were changed as shown in Table 4. The physical properties of the obtained polypropylene fibers are shown in Table 4.

Examples 23

The same polypropylene resin as in Example 18 was discharged at a mass flow of 46 g/min (1.3 g/min per hole) from a spinning nozzle having 36 discharge holes in which each discharge hole diameter is 0.5 mmφ. After cooling and solidifying by applying cold air at 20° C., an oil agent was adhered, and the yarn was wound around a bobbin at a take-up speed of 300 m/min to obtain an undrawn yarn. As shown in Table 3, the undrawn yarn has a crystalline structure ratio of 0%, a meso-structure ratio of 53.0%, an amorphous structure ratio of 47.0%, and a birefringence value of $1.02 \times 10^{-3}$, which was low in crystallinity and orientation. With respect to the obtained undrawn yarn, preheating was carried out using the hot roll so as to have the yarn temperature of 85° C., and the hot plate drawing was performed in a first stage at 6.0 times at the yarn temperature of 135° C., as shown in Table 4. Further, preheating was carried out continuously with the hot roll so as to have the yarn temperature of 120° C., the hot plate drawing was performed in a second stage at 1.7 times, at the yarn temperature of 165° C., a deformation rate of 6.63 (1/second), and a drawing tension of 2.46 cN/dtex. A drawing velocity of the second stage was 300 m/min. The obtained fiber had a strength of 8.4 cN/dtex, an initial elastic modulus of 140 cN/dtex, and a fiber having high strength and high initial elastic modulus was obtained. A elongation at break was 15.0% and the single fiber fineness was 4.3 dtex (see Table 4).

Examples 24 to 25

Polypropylene fibers were obtained using the same undrawn yarn as in Example 23 and in the same manner as in Example 23 except that the drawing temperature and the draw ratio of the first stage and the drawing temperature, the draw ratio, and the deformation rate of the second stage were as shown in Table 4. The physical properties of the obtained polypropylene fibers are shown in Table 4.

Comparative Example 7

The same undrawn yarn as in Example 18 was preheated using the hot roll to have a yarn temperature of 85° C. and drawn in one stage as shown in Table 4. The hot plate drawing was performed at 7.2 times, at the yarn temperature of 135° C., a deformation rate of 14.4 (1/sec), and a drawing tension of 1.32 cN/dtex. The drawing velocity was 300 m/min. As shown in Table 4, the obtained fiber had a strength of 7.3 cN/dtex and an initial elastic modulus of 97 cN/dtex, which were lower than the Example. The elongation at break was 18.0%, and the single fiber fineness was 6.0 dtex.

Comparative Example 8

The same undrawn yarn having low crystallinity and low orientation as in Example 18 was preheated using the hot roll to have a yarn temperature of 85° C. and drawn in one stage as shown in Table 4. The hot plate drawing was performed at 7.7 times, at the yarn temperature of 155° C., a deformation rate of 14.5 (1/sec), and a drawing tension of 1.28 cN/dtex. The drawing velocity was 300 m/min. As shown in Table 4, the obtained fiber had a strength of 7.1 cN/dtex and an initial elastic modulus of 91 cN/dtex, which were lower than the Example. The elongation at break was 16.4%, and the single fiber fineness was 5.7 dtex.

Comparative Example 9

The same polymer as in Example 18 was charged into an extruder of a melt spinning apparatus, melt kneaded at 220° C., and discharged at a mass flow of 30 g/min (1.5 g/min per hole) from a nozzle (0.5 mmφ, 20 holes) at 220° C. After cooling and solidifying by applying cold air at 20° C., an oil agent was adhered, and the yarn was wound around a bobbin at a take-up speed of 300 m/min at room temperature to obtain an undrawn yarn. The undrawn yarn had a crystal fraction of 42.4%, a meso fraction of 0%, an amorphous fraction of 57.6%, and a birefringence value of $3.32 \times 10^{-3}$, which has high ratio of crystalline structure and high orientation. As shown in Table 4, with respect to the obtained undrawn yarn, preheating was performed so as to have a yarn temperature of 85° C. using the hot roll, and the hot plate drawing was performed in a first stage at 6.3 times at the yarn temperature of 145° C. Further, preheating was carried out continuously with the hot roll so as to have the yarn temperature of 120° C., the hot plate drawing was performed in a second stage at the yarn temperature of 165° C. and at 1.2 times, a deformation rate of 2.78 (1/second), and a drawing tension of 2.99 cN/dtex. The drawing velocity was 300 m/min. The obtained fiber had a strength of 7.0 cN/dtex and an initial elastic modulus of 103 cN/dtex, which were lower in strength and initial elastic modulus than those in the Example. The elongation at break was 17.2%, and the single fiber fineness was 6.3 dtex.

Comparative Example 10

Polypropylene resin (SA01A, melting point of resin: 168.3° C., MFR=10 g/10 min [230° C., load: 2.16 kg, 10 min] manufactured by Japan Polypropylene Corporation) was charged into an extruder of a melt spinning apparatus, melt kneaded at 280° C., and discharged at a mass flow of 34 g/min (1.4 g/min per hole) from a nozzle (0.4 mmφ, 24 holes) at 280° C., as shown in Table 3. After cooling and solidifying by applying cold air at 20° C., an oil agent was adhered, and the yarn was wound around a bobbin at a take-up speed of 300 m/min at room temperature to obtain an undrawn yarn. As shown in Table 3, this undrawn yarn had a crystal fraction of 46.0%, a meso fraction of 0%, an amorphous fraction of 54.0%, and a birefringence value of $2.36 \times 10^{-3}$, which was higher in crystallinity and orientation than the Example. With respect to the undrawn yarn, preheating was carried out using the hot roll so as to have a yarn temperature of 85° C. As shown in Table 4, the first stage drawing was performed at 6.3 times at a yarn temperature of 135° C. Further, preheating was carried out continuously with the hot roll so as to have a yarn temperature of 120° C., and the hot plate drawing was performed in a second stage at 1.2 times, at the yarn temperature of 160° C., a deformation rate of 3.06 (1/sec), and a drawing tension of 1.92 cN/dtex. The drawing velocity was 300 m/min. The obtained fiber had a strength of 8.0 cN/dtex and an initial elastic modulus of 85 cN/dtex, which were lower in the strength and the initial elastic modulus than those in the Example. The elongation at break was 24.6%, and the single fiber fineness was 5.6 dtex (see Table 4).

Comparative Example 11

Polypropylene resin (SA03A, melting point of resin: 168.7° C., MFR=30 g/10 min [230° C., load: 2.16 kg, 10 min] manufactured by Japan Polypropylene Corporation) was charged into an extruder of a melt spinning apparatus, melt kneaded at 280° C., and discharged at a mass flow of 34 g/min (1.4 g/min per hole) from a nozzle (0.4 mmφ, 24 holes) at 280° C. After cooling and solidifying by applying cold air at 20° C., an oil agent was adhered, and the yarn was wound around a bobbin at a take-up speed of 300 m/min at room temperature to obtain an undrawn yarn (see Table 3). As shown in Table 3, the undrawn yarn had a birefringence value of $1.06 \times 10^{-3}$, which was almost the same molecular orientation as in the Example, however, a crystal fraction of 40.1%, a meso fraction of 0%, and an amorphous fraction of 59.9%, which was higher in crystallinity than the Example. With respect to the obtained undrawn yarn, preheating was carried out using the hot roll so as to have a yarn temperature of 85° C. As shown in Table 4, the hot plate drawing was performed in a first stage at 7.9 times at the yarn temperature of 135° C. and. Further, preheating was carried out continuously with the hot roll so as to have the yarn temperature of 120° C., and the hot plate drawing was performed in a second stage at 1.2 times, at the yarn temperature of 160° C., a deformation rate of 3.06 (1/sec), a drawing tension of 1.72 cN/dtex. The drawing velocity was 300 m/min. The obtained fiber had a strength of 7.5 cN/dtex and an initial elastic modulus of 88 cN/dtex, which were lower than those in the Example. The elongation at break was 15.1%, and the single fiber fineness was 4.5 dtex.

TABLE 3

| | Resin | | Spinning temperature (° C.) | Resin melting point (° C.) | Resin melting point (° C.) | Take-up speed of undrawn yarn (m/min) | Ratio of structure (mass %) | | | Birefringence value |
|---|---|---|---|---|---|---|---|---|---|---|
| | Polypropylene resin | MFR (g/min) | | | | | Crystallinity structure | Meso-structure | Amorphous structure | |
| Example 18 | Y2000GV | 18 | 280 | 169.4 | 110.6 | 300 | 0.0 | 57.6 | 42.4 | 0.88 × 10⁻³ |
| Example 19 | Y2000GV | 18 | 280 | 169.4 | 110.6 | 300 | 0.0 | 57.6 | 42.4 | 0.88 × 10⁻³ |
| Example 20 | Y2000GV | 18 | 280 | 169.4 | 110.6 | 300 | 0.0 | 57.6 | 42.4 | 0.88 × 10⁻³ |
| Example 21 | Y2000GV | 18 | 280 | 169.4 | 110.6 | 300 | 0.0 | 57.6 | 42.4 | 0.88 × 10⁻³ |
| Example 22 | Y2000GV | 18 | 280 | 169.4 | 110.6 | 300 | 0.0 | 57.6 | 42.4 | 0.88 × 10⁻³ |
| Example 23 | Y2000GV | 18 | 280 | 169.4 | 110.6 | 300 | 0.0 | 53.0 | 47.0 | 1.02 × 10⁻³ |
| Example 24 | Y2000GV | 18 | 280 | 169.4 | 110.6 | 300 | 0.0 | 53.0 | 47.0 | 1.02 × 10⁻³ |
| Example 25 | Y2000GV | 18 | 280 | 169.4 | 110.6 | 300 | 0.0 | 53.0 | 47.0 | 1.02 × 10⁻³ |
| Comparative Example 7 | Y2000GV | 18 | 280 | 169.4 | 110.6 | 300 | 0.0 | 57.6 | 42.4 | 0.88 × 10⁻³ |
| Comparative Example 8 | Y2000GV | 18 | 280 | 169.4 | 110.6 | 300 | 0.0 | 57.6 | 42.4 | 0.88 × 10⁻³ |
| Comparative Example 9 | Y2000GV | 18 | 220 | 169.4 | 50.6 | 300 | 42.4 | 0.0 | 57.6 | 3.32 × 10⁻³ |
| Comparative Example 10 | SA01A | 10 | 280 | 168.3 | 111.7 | 300 | 46.0 | 0.0 | 54.0 | 2.36 × 10⁻³ |
| Comparative Example 11 | SA03A | 30 | 280 | 168.7 | 111.3 | 300 | 40.1 | 0.0 | 59.9 | 1.06 × 10⁻³ |

TABLE 4

| | Drawn yarn | | | | | |
|---|---|---|---|---|---|---|
| | | | First stage | | Second stage | |
| | | Total draw ratio | Temperature (° C.) | Draw ratio (times) | Temperature (° C.) | Draw ratio (times) |
| | Stages | | | | | |
| Example 18 | two stage | 10.0 | 145 | 9.1 | 165 | 1.1 |
| Example 19 | two stage | 10.0 | 145 | 8.4 | 165 | 1.2 |
| Example 20 | two stage | 11.0 | 145 | 9.2 | 165 | 1.2 |
| Example 21 | two stage | 11.0 | 145 | 8.5 | 165 | 1.3 |
| Example 22 | two stage | 10.1 | 145 | 7.2 | 165 | 1.4 |
| Example 23 | two stage | 10.0 | 135 | 6.0 | 165 | 1.7 |
| Example 24 | two stage | 9.6 | 145 | 8.0 | 155 | 1.2 |
| Example 25 | two stage | 10.8 | 145 | 8.0 | 175 | 1.35 |
| Comparative Example 7 | two stage | 7.2 | 135 | 7.2 | — | — |
| Comparative Example 8 | two stage | 7.7 | 155 | 7.7 | — | — |
| Comparative Example 9 | two stage | 7.5 | 145 | 6.3 | 165 | 1.2 |
| Comparative Example 10 | two stage | 7.5 | 135 | 6.3 | 160 | 1.2 |
| Comparative Example 11 | two stage | 9.6 | 135 | 7.9 | 160 | 1.2 |

| | Final stage | Drawn yarn | | | | | |
|---|---|---|---|---|---|---|---|
| | Deformation rate (1/sec) | Tension (cN/Dtex) | Drawing velocity (m/min) | Strength (cN/dtex) | Initial elastic modulus (cN/dtex) | Elongation at break (%) | Fineness(dtex) |
| | | | | | | | Single fiber / Total fineness |
| Example 18 | 1.52 | 2.79 | 300 | 9.4 | 142 | 16.2 | 4.4 / 87.5 |
| Example 19 | 2.78 | 2.79 | 300 | 9.2 | 143 | 15.5 | 4.4 / 88.6 |
| Example 20 | 2.78 | 3.58 | 300 | 8.4 | 152 | 12.0 | 4.1 / 81.2 |
| Example 21 | 3.85 | 3.63 | 300 | 8.9 | 151 | 12.9 | 4.1 / 81.1 |
| Example 22 | 4.76 | 2.92 | 300 | 9.0 | 153 | 14.0 | 4.4 / 87.7 |
| Example 23 | 6.63 | | | | | | |
| Example 24 | 2.78 | | | | | | |
| Example 25 | 4.32 | | | | | | |
| Comparative Example 7 | 14.4 | | | | | | |
| Comparative Example 8 | 14.5 | | | | | | |
| Comparative Example 9 | 2.78 | | | | | | |
| Comparative Example 10 | 3.06 | | | | | | |
| Comparative Example 11 | 3.06 | | | | | | |

TABLE 4-continued

| | | | | | | | |
|---|---|---|---|---|---|---|---|
| Example 23 | 2.46 | 300 | 8.4 | 140 | 15.0 | 4.3 | 153.5 |
| Example 24 | 2.87 | 300 | 8.5 | 130 | 16.4 | 4.4 | 159.8 |
| Example 25 | 2.74 | 300 | 8.6 | 150 | 13.4 | 3.9 | 140.2 |
| Comparative Example 7 | 1.32 | 300 | 7.3 | 97 | 18.0 | 6.0 | 121.0 |
| Comparative Example 8 | 1.28 | 300 | 7.1 | 91 | 16.4 | 5.7 | 114.1 |
| Comparative Example 9 | 2.99 | 300 | 7.0 | 103 | 17.2 | 6.3 | 125.6 |
| Comparative Example 10 | 1.92 | 300 | 8.0 | 85 | 24.6 | 5.6 | 135.5 |
| Comparative Example 11 | 1.72 | 300 | 7.5 | 68 | 15.1 | 4.5 | 107.7 |

Example 26

As shown in Table 5, polypropylene resin (Y2000 GV, melting point of resin=169.8° C., MFR=18 g/10 min [230° C., load: 2.16 kg, 10 min] manufactured by Prime Polymer Co., Ltd.) was extruded from a melt spinning apparatus, melt kneaded at 280° C., and discharged from a spinning nozzle having 36 discharge holes in which each discharge hole diameter is 0.5 mmφ at a mass flow of 45.3 g/min (1.26 g/min). After cooling and solidifying by applying cold air at 20° C. to the fiber, an oil agent was adhered, and the yarn was wound around a bobbin at a take-up speed of 300 m/min to obtain an undrawn yarn. The undrawn yarn had a crystal structure ratio of 0%, a meso structure ratio of 53.0%, an amorphous structure ratio of 47.0%, and a birefringence value of $0.88 \times 10^{-3}$, which was low in crystallinity and orientation. The obtained undrawn yarn was preheated with the hot roll so as to have a yarn temperature of 85° C., and the hot plate drawing in the first stage was performed at a yarn temperature of 145° C. and a draw ratio of 6.0 times. As a result of structural analysis of the process yarn at the completion of the first stage drawing, as shown in Table 5, an intensity ratio in the meridian direction with respect to an intensity in the equatorial direction by the small angle X scattering measurement was 1.45. An area ratio of the melting peak at 160° C. to 166° C. with respect to the melting peak at 168° C. to 174° C. was 54.6% by the DSC measurement, which was low in the inhomogeneous structure. Further, preheating was carried out continuously with the hot roll so as to have the yarn temperature of 120° C., and the hot plate drawing was performed in a second stage drawing so as to have the yarn temperature of 165° C., a draw ratio of 1.2 times, and a deformation rate of 2.78 (1/sec). The drawing velocity was 300 m/min, and a polypropylene fiber (see Table 6) was obtained. As shown in Table 6, the strength of the obtained polypropylene fiber was as high as 6.7 cN/dtex for fiber strength and 86.1 cN/dtex for initial elastic modulus, and the fiber was less fluffed. The elongation at break was 21.8%, and the single fiber fineness was 5.8 dtex.

Example 27

A polypropylene fiber having a single fiber fineness of 4.2 dtex was obtained in the same manner as in Example 26 except that the second stage drawing was performed at a yarn temperature of 165° C., a draw ratio of 1.66 times, and a deformation rate of 6.63 (1/sec). The results are shown in Tables 5 and 6. The obtained polypropylene fiber had both high strength and initial elastic modulus and less fluffed.

Example 28

A polypropylene fiber having a single fiber fineness of 4.4 dtex was obtained in the same manner as in Example 26 except that the first stage drawing was performed at a yarn temperature of 145° C. and a draw ratio of 8.0 times. The results are shown in Tables 5 and 6. The obtained polypropylene fiber had both high strength and initial elastic modulus and less fluffed.

Example 29

A polypropylene fiber having a single fiber fineness of 4.7 dtex was obtained in the same manner as in Example 26 except that the second stage drawing was performed at a yarn temperature of 165° C., a draw ratio of 1.5 times, and a deformation rate of 5.56 (1/sec). The results are shown in Tables 5 and 6. The obtained polypropylene fiber had both high strength and initial elastic modulus and less fluffed.

Example 30

A polypropylene fiber having a single fiber fineness of 4.6 dtex was obtained in the same manner as in Example 26 except that the first stage drawing was carried out at a yarn temperature of 135° C., and the second stage drawing was performed at a draw ratio of 1.5 times and a deformation race of 5.56 (1/second). The results are shown in Tables 5 and 6. The obtained polypropylene fiber had both high strength and initial elastic modulus and less fluffed.

Example 31

A polypropylene fiber having a single fiber fineness of 3.9 dtex was obtained in the same manner as in Example 26 except that the hot plate drawing was performed in a first stage drawing at a draw ratio of 8.0 times, and the hot plate drawing was performed in a second stage drawing at a yarn temperature of 165° C., a draw ratio of 1.35 times, and a deformation rate of 4.32 (1/sec). The results are shown in Tables 5 and 6. The obtained polypropylene fiber had both high strength and initial elastic modulus and less fluffed.

Example 32

A polypropylene fiber having a single fiber fineness of 4.4 dtex was obtained in the same manner as in Example 26 except that a yarn temperature was 155° C. and a draw ratio was 8.0 times in the first stage drawing. The results are shown in Tables 5 and 6. The obtained polypropylene fiber had both high strength and initial elastic modulus and less fluffed.

Comparative Example 12

A polypropylene fiber having a single fiber fineness of 5.8 dtex was obtained in the same manner as in Example 26 except that a draw ratio was 4.0 times in the first stage drawing and a draw ratio was 1.8 times and a deformation rate was 7.41 (1/sec) in the second stage drawing. The results are shown in Tables 5 and 6. The obtained polypropylene fiber had a strength of 4.5 cN/dtex and the initial elastic modulus of 65.4 cN/dtex, which were both low in the strength and the initial elastic modulus, and is highly fluffed.

Comparative Example 13

A polypropylene fiber having a single fiber fineness of 5.1 dtex was obtained in the same manner as in Example 26 except that a draw ratio was 4.0 times in the first stage drawing and a draw ratio was 2.0 times and a deformation rate was 8.33 (1/sec) in the second stage drawing. The results are shown in Tables 5 and 6. The obtained polypropylene fiber had a strength of 5.8 cN/dtex and an initial elastic modulus of 81.6 cN/dtex, which were both low in the strength and the initial elastic modulus, and is highly fluffed.

Comparative Example 14

Although attempting to produce a polypropylene fiber in the same manner as in Example 26 except that a draw ratio was 4.0 times in the first stage drawing, and a draw ratio was 2.5 times and a deformation rate was 10 (1/sec) in the second stage drawing, yarn breakage occurred and a final fiber was not able to be obtained.

Comparative Example 15

Although attempting to manufacture a polypropylene fiber in the same manner as in Example 26 except that a yarn temperature was 155° C. in the first stage drawing, and a draw ratio was 1.5 times and a deformation rate was 5.56 (1/sec) in the second stage drawing, yarn breakage occurred and a final fiber was not able to be obtained.

TABLE 5

| | Preheating in second stage ° C. | Second stage | | | | Spinning property | Single | | Strength cN/dtex | Elongation at break % | Initial elastic modulus cN/dtex |
|---|---|---|---|---|---|---|---|---|---|---|---|
| | | Yarn temperature ° C. | Draw ratio | Deformation rate 1/sec | Drawing velocity m/min | Total draw ratio | | fiber fineness dtex | Total fineness dtex | | | |
| Example 26 | 120 | 165 | 1.2 | 2.78 | 300 | 7.2 | favorable | 5.8 | 209 | 6.7 | 21.8 | 86.1 |
| Example 27 | 120 | 165 | 1.66 | 6.63 | 300 | 9.96 | favorable | 4.2 | 153 | 7.6 | 11.7 | 134.1 |
| Example 28 | 120 | 165 | 1.2 | 2.78 | 300 | 9.6 | favorable | 4.4 | 159 | 8.5 | 17.1 | 127.6 |
| Example 29 | 120 | 165 | 1.5 | 5.56 | 300 | 9 | favorable | 4.7 | 168 | 7.4 | 14.0 | 114.6 |
| Example 30 | 120 | 165 | 1.5 | 5.56 | 300 | 9 | favorable | 4.6 | 167 | 8.0 | 15.5 | 126.7 |
| Example 31 | 120 | 165 | 1.35 | 4.32 | 300 | 10.8 | favorable | 3.9 | 141 | 9.1 | 13.1 | 159.2 |
| Example 32 | 120 | 165 | 1.2 | 2.78 | 300 | 9.6 | favorable | 4.4 | 158 | 7.8 | 15.5 | 130.2 |
| Comparative Example 12 | 120 | 165 | 1.8 | 7.41 | 300 | 7.2 | single yarn breakage, highly fluffed | 5.8 | 210 | 4.5 | 14.7 | 65.4 |
| Comparative Example 13 | 120 | 165 | 2 | 8.33 | 300 | 8 | highly fluffed | 5.1 | 185 | 5.8 | 15.0 | 81.6 |
| Comparative Example 14 | 120 | 165 | 2.5 | 10 | 300 | 10 | fiber bundle breakage | — | — | — | — | — |
| Comparative Example 15 | 120 | 165 | 1.5 | 5.56 | 300 | 9 | fiber bundle breakage | — | — | — | — | — |

TABLE 6

| | Preheating in second stage ° C. | Second stage | | | | Spinning property | Single | | Strength cN/dtex | Elongation at break % | Initial elastic modulus cN/dtex |
|---|---|---|---|---|---|---|---|---|---|---|---|
| | | Yarn temperature ° C. | Draw ratio | Deformation rate 1/sec | Drawing velocity m/min | Total draw ratio | | fiber fineness dtex | Total fineness dtex | | | |
| Example 26 | 120 | 165 | 1.2 | 2.78 | 300 | 7.2 | favorable | 5.8 | 209 | 6.7 | 21.8 | 86.1 |
| Example 27 | 120 | 165 | 1.66 | 6.63 | 300 | 9.96 | favorable | 4.2 | 153 | 7.6 | 11.7 | 134.1 |
| Example 28 | 120 | 165 | 1.2 | 2.78 | 300 | 9.6 | favorable | 4.4 | 159 | 8.5 | 17.1 | 127.6 |
| Example 29 | 120 | 165 | 1.5 | 5.56 | 300 | 9 | favorable | 4.7 | 168 | 7.4 | 14.0 | 114.6 |
| Example 30 | 120 | 165 | 1.5 | 5.56 | 300 | 9 | favorable | 4.6 | 167 | 8.0 | 15.5 | 126.7 |
| Example 31 | 120 | 165 | 1.35 | 4.32 | 300 | 10.8 | favorable | 3.9 | 141 | 9.1 | 13.1 | 159.2 |
| Example 32 | 120 | 165 | 1.2 | 2.78 | 300 | 9.6 | favorable | 4.4 | 158 | 7.8 | 15.5 | 130.2 |
| Comparative Example 12 | 120 | 165 | 1.8 | 7.41 | 300 | 7.2 | single yarn breakage, highly fluffed | 5.8 | 210 | 4.5 | 14.7 | 65.4 |
| Comparative Example 13 | 120 | 165 | 2 | 8.33 | 300 | 8 | highly fluffed | 5.1 | 185 | 5.8 | 15.0 | 81.6 |
| Comparative Example 14 | 120 | 165 | 2.5 | 10 | 300 | 10 | fiber bundle breakage | — | — | — | — | — |
| Comparative Example 15 | 120 | 165 | 1.5 | 5.56 | 300 | 9 | fiber bundle breakage | — | — | — | — | — |

The invention claimed is:

1. A polypropylene fiber, having an amorphous orientation degree of 88% or higher,
wherein
a strength is 7 cN/dtex or more,
an initial elastic modulus is 100 cN/dtex or more, and
a elongation at break is 10% to 30%.

2. The polypropylene fiber according to claim 1, wherein a single fiber fineness is 3 dtex to 20 dtex.

3. The polypropylene fiber according to claim 1, wherein a total fineness is 90 dtex to 900 dtex.

4. The polypropylene fiber according to claim 1, having an amorphous orientation degree of 90% to 92%.

5. A polypropylene fiber, having an amorphous orientation degree of 85% or higher and a crystallinity degree of 60% to 75% as determined by wide angle X-ray diffraction.

6. The polypropylene fiber according to claim 5, having an amorphous orientation degree of 88% to 98%.

7. The polypropylene fiber according to claim 5, wherein a single fiber fineness is 3 dtex to 20 dtex.

8. The polypropylene fiber according to claim 5, wherein a total fineness is 90 dtex to 900 dtex.

9. The polypropylene fiber according to claim 5, wherein
a strength is 7 cN/dtex or more,
an initial elastic modulus is 100 cN/dtex or more, and
a elongation at break is 10% to 30%.

10. A polypropylene fiber, having an amorphous orientation degree of 85% or higher and an endothermic melting peak of 85 J/g to 12.0 J/g as determined by differential scanning calorimetry.

11. The polypropylene fiber according to claim 10, having an amorphous orientation degree of 88% to 98%.

12. The polypropylene fiber according to claim 10, wherein a single fiber fineness is 3 dtex to 20 dtex.

13. The polypropylene fiber according to claim 10, wherein a total fineness is 90 dtex to 900 dtex.

14. The polypropylene fiber according to claim 10, wherein
a strength is 7 cN/dtex or more,
an initial elastic modulus is 100 cN/dtex or more, and
a elongation at break is 10% to 30%.

15. A polypropylene fiber, having an amorphous orientation degree of 85% or higher and
a ratio of a scattering intensity in a meridian direction to a scattering intensity in an equatorial direction of 0.5 to 0.95 as determined by small angle X-ray scattering.

16. The polypropylene fiber according to claim 15, having an amorphous orientation degree of 90% to 98%.

17. The polypropylene fiber according to claim 15, wherein a single fiber fineness is 3 dtex to 20 dtex.

18. The polypropylene fiber according to claim 15, wherein a total fineness is 90 dtex to 900 dtex.

19. The polypropylene fiber according to claim 15, wherein
a strength is 7 cN/dtex or more,
an initial elastic modulus is 100 cN/dtex or more, and
a elongation at break is 10% to 30%.

* * * * *

UNITED STATES PATENT AND TRADEMARK OFFICE
CERTIFICATE OF CORRECTION

PATENT NO. : 10,870,929 B2
APPLICATION NO. : 15/743565
DATED : December 22, 2020
INVENTOR(S) : Masaki Fujie et al.

It is certified that error appears in the above-identified patent and that said Letters Patent is hereby corrected as shown below:

In the Claims

In Column 33, Line 28, Claim 10, "peak of 85 J/g to 12.0 J/g" should read -- 120 J/g --.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*